US006359762B1

(12) United States Patent
Yokomori

(10) Patent No.: US 6,359,762 B1
(45) Date of Patent: Mar. 19, 2002

(54) CONTROL METHOD OF SLIDING A VEHICLE DOOR BY A POWERED SLIDING DEVICE

(75) Inventor: Kazuhito Yokomori, Yamanashi-ken (JP)

(73) Assignee: Mitsui Kinzoku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/436,625

(22) Filed: Nov. 9, 1999

(30) Foreign Application Priority Data

Nov. 9, 1998 (JP) .......................................... 10-333433

(51) Int. Cl.7 ................................................ H02H 3/00
(52) U.S. Cl. ......................................... 361/51; 361/115
(58) Field of Search ............................. 361/51, 90, 18, 361/115, 1, 23, 24

(56) References Cited

U.S. PATENT DOCUMENTS 5,076,016 A * 12/1991 Adams et al. ................ 49/360
5,564,761 A 10/1996 Mizuki et al. .............. 292/201
5,618,068 A 4/1997 Mitsui et al. ............... 292/201
5,833,301 A * 11/1998 Watanabe et al. ........... 296/155

* cited by examiner

*Primary Examiner*—Stephen W. Jackson
(74) *Attorney, Agent, or Firm*—Browdy and Neimark

(57) ABSTRACT

A control method of a powered sliding device having a wire drum coupled through a wire cable with a sliding door slidably attached to a vehicle body, a motor for rotating the wire drum by the electric power from a battery, a voltmeter for measuring the battery voltage of the battery, and a sensor for detecting the sliding speed of the sliding door, comprises the steps of: measuring the sliding speed SS by the sensor when a predetermined time has elapsed from an actuation of the motor; comparing the measured sliding speed SS with the lower limited speed LLS of the sliding door determined according to the degree of the battery voltage BV measured by the voltmeter; and stopping or reversing the motor when the sliding speed SS is slower than the lower limited speed LLS.

8 Claims, 16 Drawing Sheets

FIG. 2
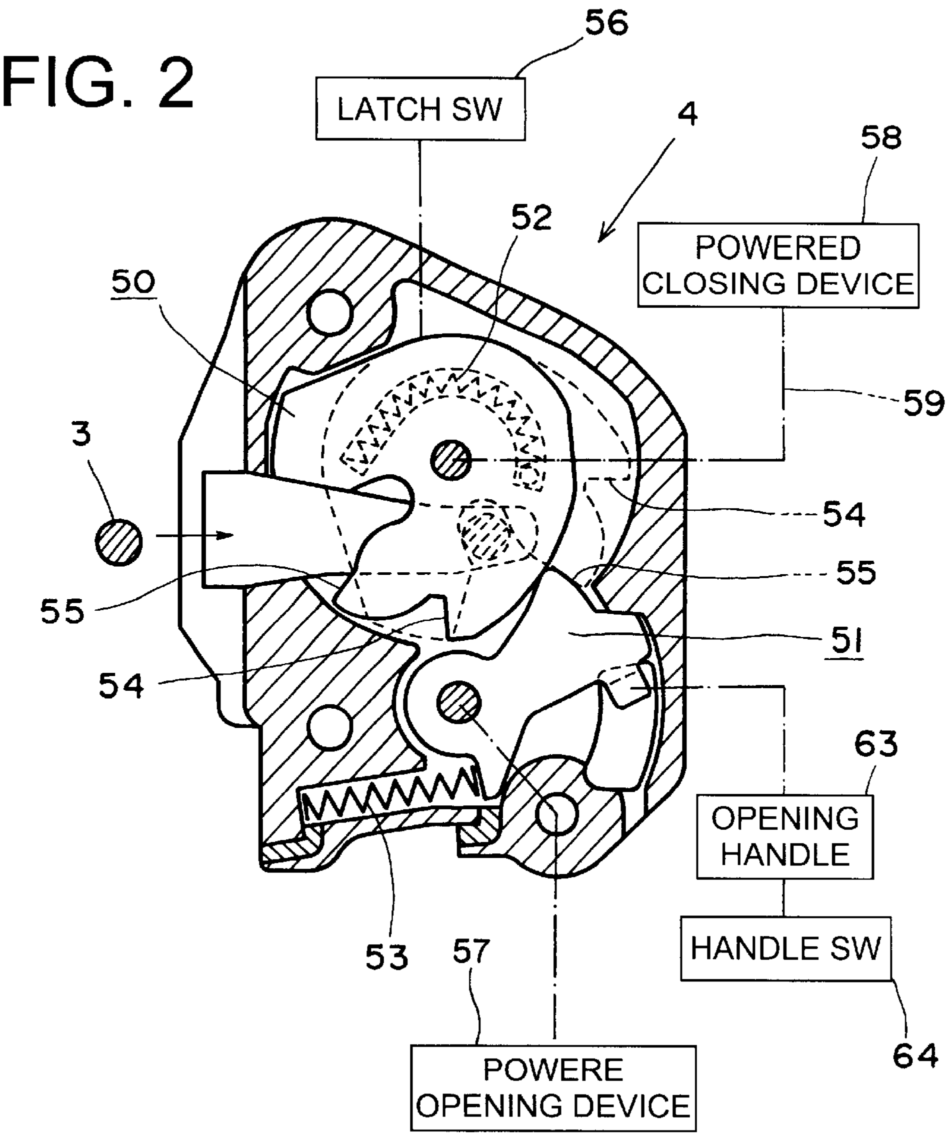
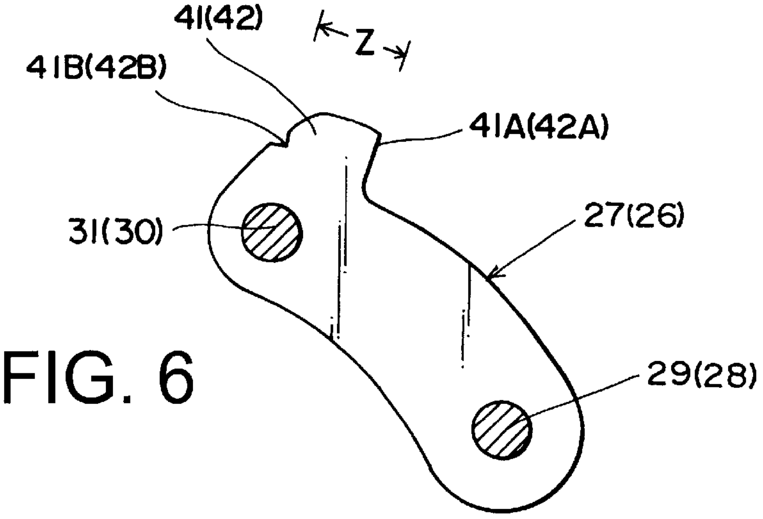
FIG. 6

FIG. 8
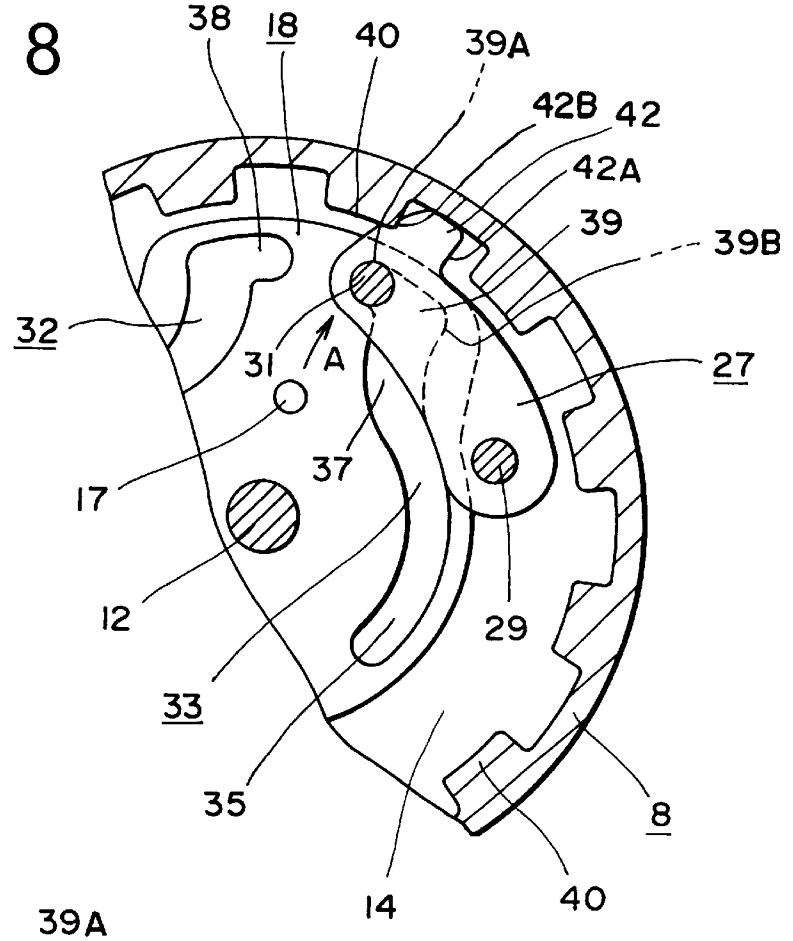
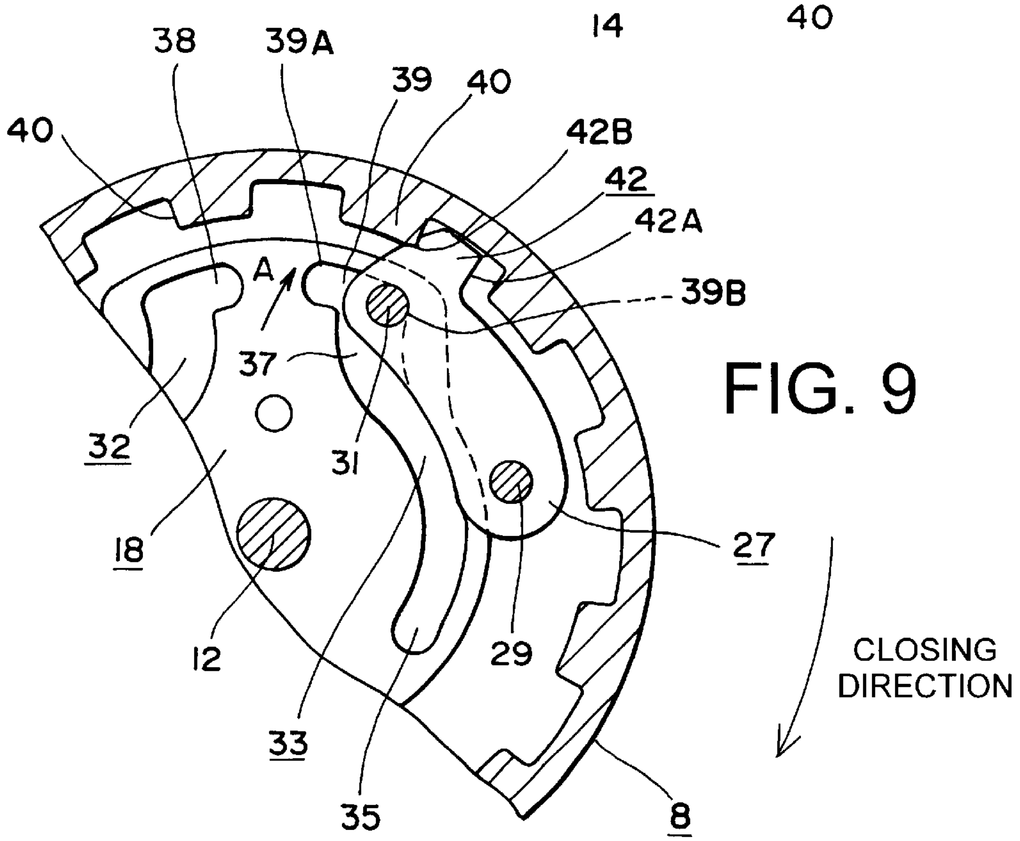
FIG. 9

CONTROL METHOD OF SLIDING A VEHICLE DOOR BY A POWERED SLIDING DEVICE

FIELD OF THE INVENTION

The present invention relates to a control me sliding a vehicle sliding door by a powered sliding device and, more particularly, to the safety control for detecting an abnormal movement of a sliding door, and the quality control for improving the operational feeling of a door and the durability of each part of the device by controlling the sliding speed of a door.

BACKGROUND OF THE INVENTION

Conventionally, various kinds of powered sliding devices for sliding a sliding door of a vehicle body by a motor power have been proposed. These powered sliding devices have a safety device for dealing with accidents such that the body of an operator or a package is caught between the vehicle body and the door. When an occurrence of the accident has been detected, the safety device stops the door or moves the door in the opposite direction to decrease the damage caused by the accident.

Almost all of the conventional safety devices are set to detect the accident by monitoring the current value (load) of an electric motor of the powered sliding device. However, there is a problem that the change of the current value of the motor occurs behind the occurrence of the accident.

U.S. Pat. No. 5,833,301 assigned to the same assignee as the present application describes a safety device which comprises a sensor for detecting the sliding speed of a sliding door and an ammeter for detecting the load of a motor to slide the door. This safety device has an advantage that it can quickly deal with the accident by measuring the actual sliding speed of the door by using the sensor. However, an error detection of the accident may occur unless the sliding speed measured by the sensor is processed to be used.

SUMMARRY OF THE INVENTION

Accordingly, it is an object of the present invention to provide a control method of a powered sliding device in which it is possible to more accurately detect accidents such that the body of an operator is caught between a vehicle body and a door, by using the sliding speed of the sliding door measured by a sensor.

Furthermore, it is another object of the present invention to provide a control method of a powered sliding device in which the operational feeling of the door and the durability of each part of the device are improved by controlling the sliding speed of the door during the beginning and ending of the actuation of the powered sliding device.

BRIEF DESCRIPTION OF THE DRAWINGS

FIG. 2 is a cross sectional view of a latch assembly;

FIG. 6 is a front view of a clutch arm of the clutch mechanism;

FIG. 8 is a cross sectional view showing a state where a wire drum is rotated in a closing direction from the first coupled state in FIG. 7;

FIG. 9 is a cross sectional view showing a first brake state of the clutch mechanism;

DESCRIPTION OF THE PREFERRED EMBODIMENTS

Figure 1:
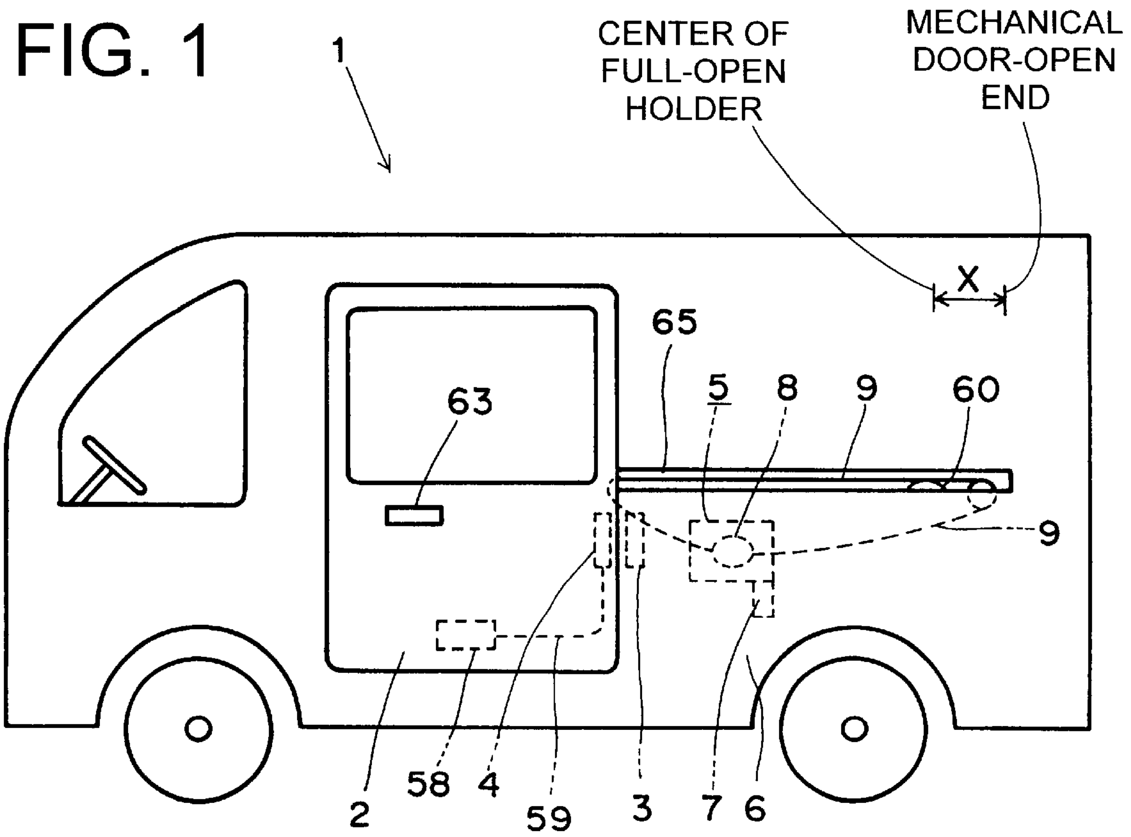
FIG. 1 is a side view of a vehicle equipped with a sliding door.

One embodiment of the present invention will be described by referring to attached drawings. FIG. 1 shows a side view of a vehicle equipped with a powered sliding device 5 according to the present invention. The vehicle comprises a vehicle body 1 and a sliding door 2 slidably mounted on the vehicle body 1. The door 2 is slidable in the back-and-forth or longitudinal direction of the vehicle body 1 along a guide rail 65 fixed to a quarter panel 6 of the vehicle body 1.

The sliding device 5 is provided in an inside space of the quarter panel 6, and comprises a reversible motor 7 and a wire drum 8 rotated by the motive power of the motor 7. The drum 8 is coupled with the door 2 by a wire cable 9, and the door 2 is slid in an opening direction or in a closing direction when the cable 9 is pulled in the opening direction or in the closing direction by the rotation of the drum 8.

Figure 3:
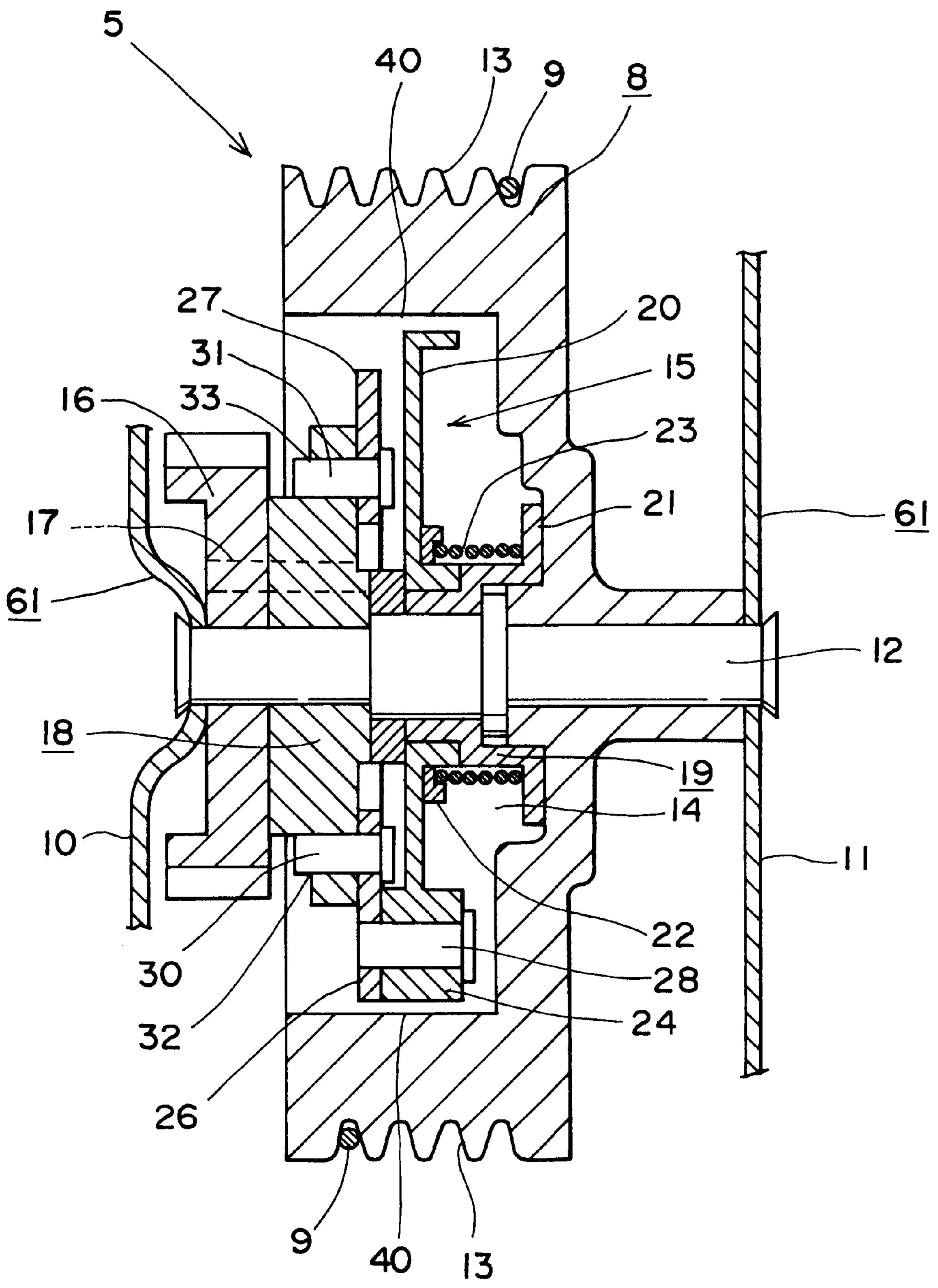
FIG. 3 is a vertically sectional side view of a powered sliding device having a clutch mechanism.
Figure 4:
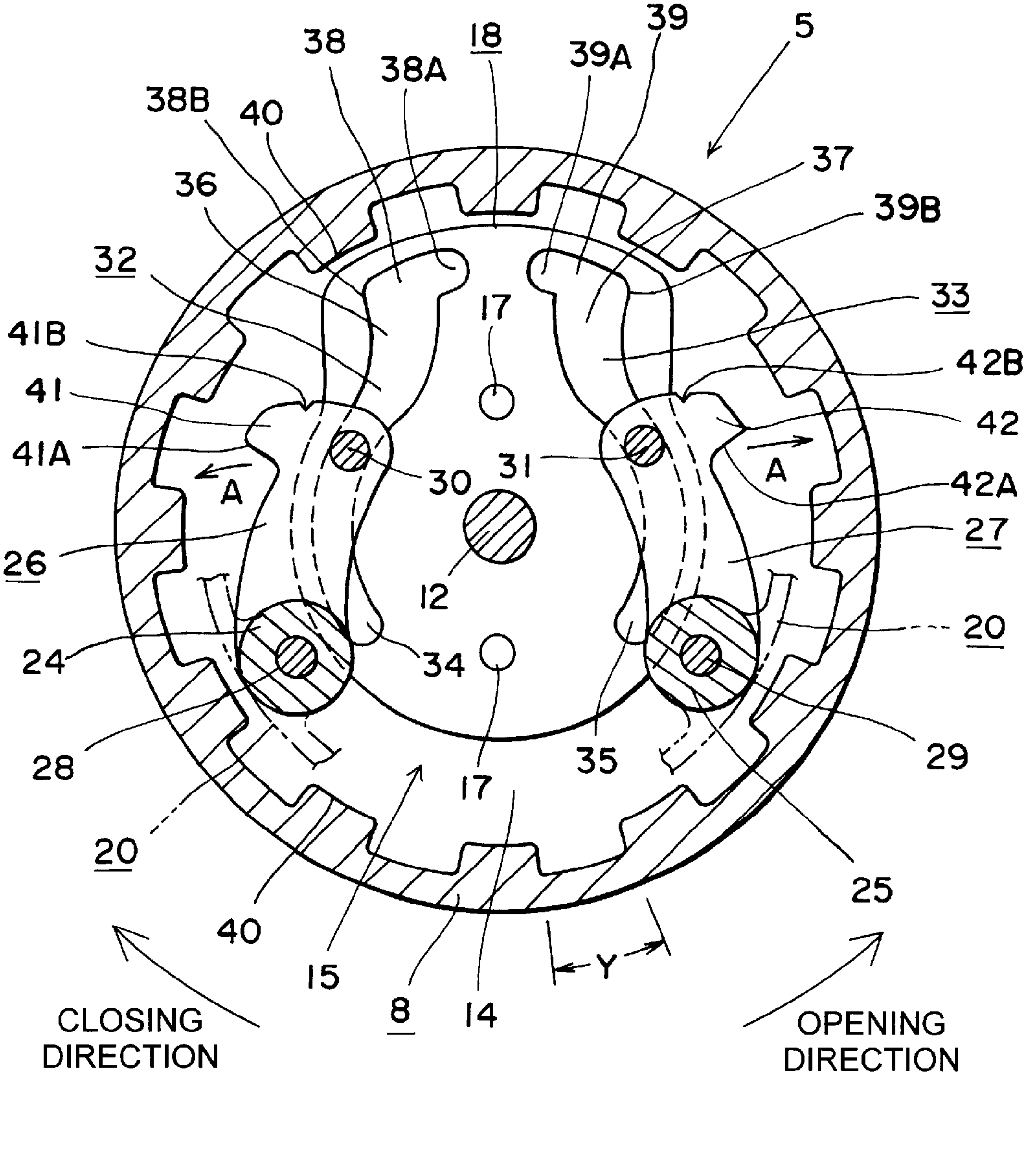
FIG. 4 is a vertically sectional front view of the powered sliding device when the clutch mechanism is in an uncoupled state.

Each of FIGS. 3, 4 shows a cross section of the powered sliding device 5. The device 5 has a housing 61 which comprises a base plate 10 fixed to the vehicle body 1 and a cover plate 11 fixed to the base plate 10 leaving a predetermined gap therebetween. The wire drum 8 is supported between the plate 10 and the plate 11 with a horizontal drum shaft 12. The drum 8 is formed into a cylindrical shape having a substantially closed end and an opposite open end. The wire cable 9 is wound on the peripheral surface of the drum 8 along a wire groove 13 formed in the peripheral surface of the drum 8.

A clutch mechanism 15 of the powered sliding device 5 is substantially contained in a comparatively large inside space 14 of the wire drum 8. The clutch mechanism 15 has a first coupled state for transmitting a closing rotation of the motor 7 to the drum 8, a second coupled state for transmitting an opening rotation of the motor 7 to the drum 8, a first brake state for transmitting a closing rotation of the drum 8 to the motor 7, a second brake state for transmitting an opening rotation of the drum 8 to the motor 7, and an uncoupled state for transmitting neither the closing rotation nor the opening rotation of the drum 8 to the motor 7. The change of the states of the clutch mechanism 15 will be described later in detail.

To the drum shaft 12, a motor gear 16, a guide plate 18, and a stepped sleeve 19 are respectively rotatably attached. The gear 16 is mechanically coupled with the motor 7 through a reduction mechanism (not shown). The gear 16 and the plate 18 are mutually fixed by a pin 17 so as to rotate as one piece, and accordingly, the motor gear 16 is omitted in FIG. 4 and the figures similar to FIG. 4 for simplifying the figures. A disk-like clutch plate 20 is rotatably attached on the periphery of the sleeve 19. The clutch plate 20 is partially shown by a phantom line in FIG. 4 and FIG. 12. Between the clutch plate 20 and an annular flange 21 of the sleeve 19, a spring 23 is provided through a member 22. The spring 23 applies a comparatively low rotational resistance to the clutch plate 20.

Figure 5:
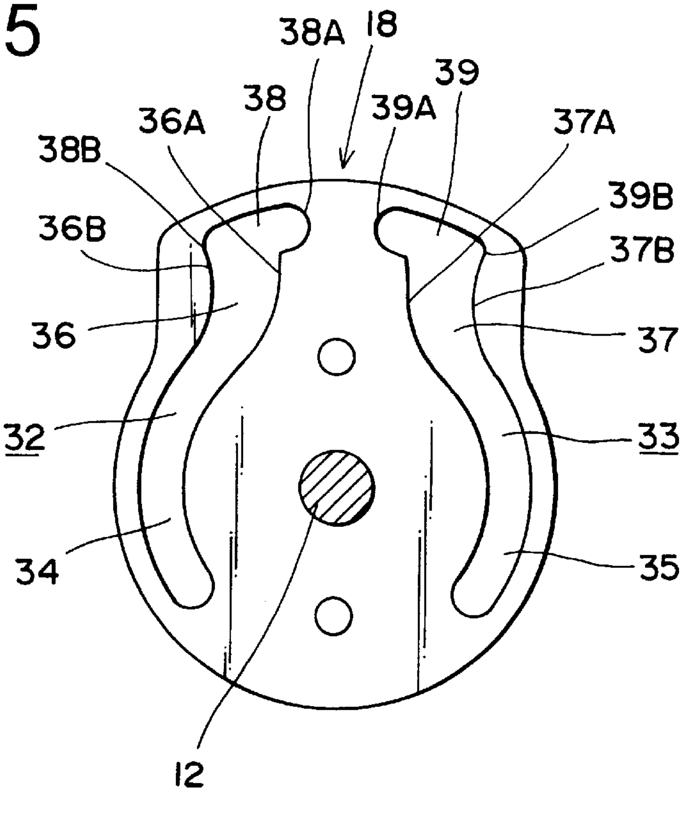
FIG. 5 is a front view of a guide plate of the clutch mechanism.
Figure 12:
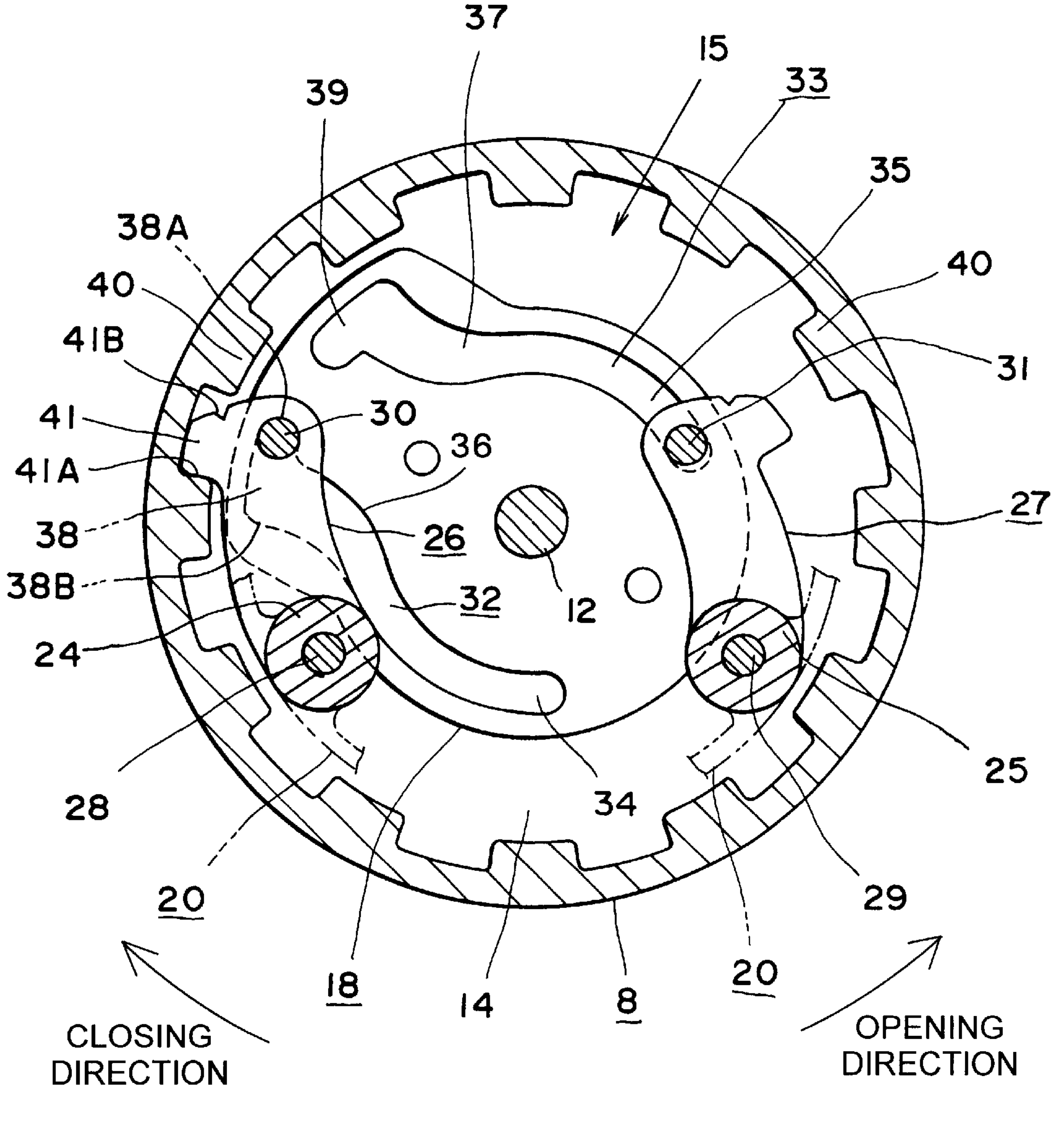
FIG. 12 is a cross sectional view showing a second coupled state of the clutch mechanism.

The clutch plate 20 has, on outer edge portions thereof, boss portions 24, 25 shown by the cross section in FIGS. 4, 12 to which clutch arms 26, 27 are rotatably attached by shafts 28, 29 in parallel with the drum shaft 12, respectively. The clutch arms 26, 27 respectively have, on the tip side thereof, clutch pins 30, 31 which are slidably engaged with guide slots 32, 33 formed in the guide plate 18, respectively. The guide slots 32, 33 are bilaterally symmetrical as best shown in FIG. 5. The guide slots 32, 33 respectively comprise circular arc inner slots 34, 35 around the drum shaft 12, circular arc outer slots 38, 39 around the drum shaft 12, and communication slots 36, 37 connecting the inner slots 34, 35 and the outer slots 38, 39. Each of the gaps between inside walls 36A, 37A and outside walls 36B, 37B of the communication slots 36, 37 is expanded as it is apart from the drum shaft 12. Semicircular engaging portions 38A, 39A are respectively formed at one sides of both outer slots 38, 39. The other sides of the outer slots 38, 39 are respectively formed into contact faces 38B, 39B which are flush with the outside walls 36B, 37B with no difference in level.

On the inner surface of the wire drum 8, plural projections 40 projecting toward the drum shaft 12 are formed at constant gaps Y. At the tips of the clutch arms 26, 27, clutch pawls 41, 42 projecting in the direction apart from the drum shaft 12 are respectively formed. One sides of the clutch pawls 41, 42 are respectively formed into coupling faces 41A, 42A roughly in parallel with the radial direction of the drum shaft 12. On the other sides of the clutch pawls 41, 42, brake dents 41B, 42B are respectively formed. Each width Z between the coupling faces 41A, 42A and the brake dents 41B, 42B is narrower than the gap Y between the projections 40.

When rotating the guide plate 18 by the motive power of the motor 7, one of the clutch pins 30, 31, to be described later in detail, is relatively moved toward the corresponding one of the outer slots 38, 39 to rotate the corresponding one of the clutch arms 26, 27 in the direction of the arrow A, and the corresponding clutch arm enters the gap Y to be engaged with the projection 40 of the wire drum 8. At this moment, the other of the clutch pins 30, 31 is merely moved in the corresponding one of the inner slots 34, 35, and accordingly, the other clutch arm is not engaged with the drum 8.

As shown in FIG. 1, a full-open holder 60 for holding the sliding door 2 at the full-open position is attached to the guide rail 65 of the vehicle body 1. Various kinds of the holders are well known. In the present application, an elastic member such as a bent leaf spring, an elastic rubber, or a roller with spring elasticity is used as the full-open holder 60. When sliding the door 2 in the opening direction, the appropriate portion of the door 2 is brought into contact with the elastic holder 60, and then the door runs over the holder, elastically deforming the holder, thereafter the door is brought into contact with the vehicle body 1 at a mechanical door-open end, and thereby the door is held at the full-open position by the elastically restored holder 60. It is also possible to attach the full-open holder 60 to the door 2 instead of the vehicle body 1. Here, the full-open position is defined as a position between the center (dead point) of the holder 60 and the mechanical door-open end, and it has a width X of a degree of several centimeters.

The sliding door 2 is provided with a latch assembly 4 for holding the door 2 at a closed position. As shown in FIG. 2, the latch assembly 4 comprises a latch 50 which is engageable with a striker 3 fixed to the vehicle body 1 and a ratchet 51 which is engageable with the latch 50. The latch 50 is urged in the clockwise direction by the elasticity of a latch spring 52, and the ratchet 51 is urged in the counterclockwise direction by the elasticity of a ratchet spring 53. When moving the door 2 in the closing direction, the latch 50 is brought into contact with the striker 3, and is rotated from an open position (unlatched position) shown by the solid line through a half-latched position where the ratchet 51 is engaged with a half-latch step 54 of the latch 50 to a full-latched position shown by the dotted line where the ratchet 51 is engaged with a full-latch step 55 of the latch 50. When the latch 50 comes to the full-latched position, the sliding door 2 is fully closed. The ratchet 51 is disengaged from the latch 50 by the operation of an opening handle 63 of the door so as to open the door. The latch assembly 4 further comprises a latch switch 56 for detecting the position of the latch 50, a handle switch 64 for detecting the actuation of the opening handle 63, a powered opening device 57 for disengaging the ratchet 51 from the latch 50, and a powered closing device 58 for rotating the latch 50 from the half-latched position to the full-latched position.

The powered closing device 58 is provided in the inside space of the sliding door 2, and is relevantly coupled with the latch 50 of the latch assembly 4 through a wire cable 59. When the latch 50 comes to the half-latched position by the movement of the door 2 in the closing direction, the closing device 58 is actuated to pull the wire cable 59 on the basis of a signal from the latch switch 56, and the latch 50 is then rotated from the half-latched position to the full-latched position so as to fully close the door 2. The structure of the closing device 58 and the coupling structure between the wire cable 59 and the latch 50 are described in detail in U.S. Pat. No. 5,564,761 and U.S. Pat. No. 5,618,068 as one example. By the way, in the present specification, the position of the door 2 when the latch 50 exists in the half-latched position is also expressed as a half-latched position, and similarly, the position of the door 2 when the latch 50 exists in the full-latched position is expressed as a half-latched position.

Figure 13:
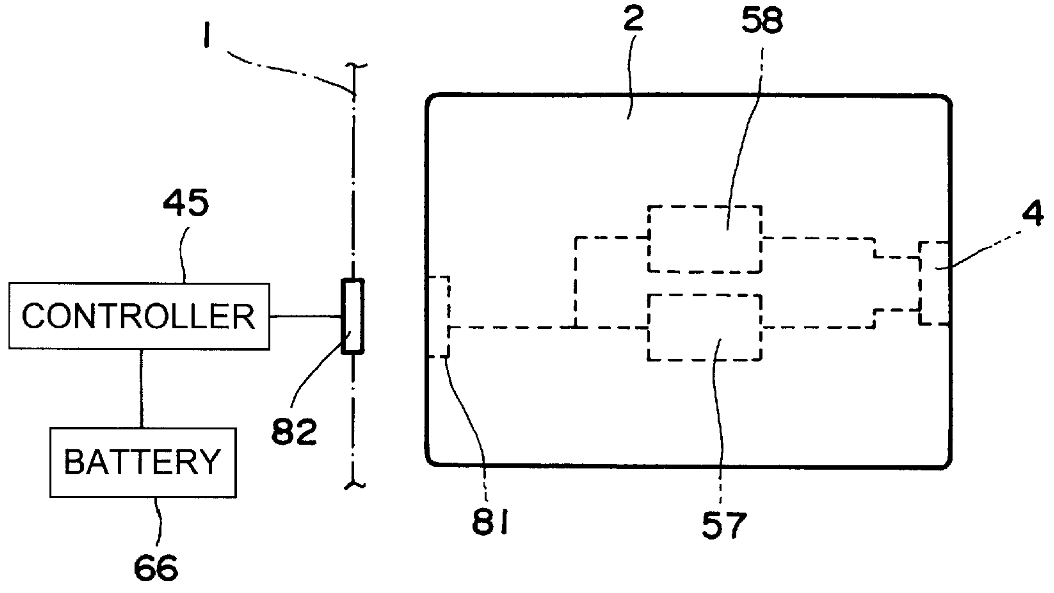
FIG. 13 is a schematic diagram showing terminals respectively provided on a vehicle body and a door.

As shown in FIG. 13, the sliding door 2 has, at the front end thereof, a door-side terminal 81 which is electrically connected to the powered closing device 58 and the powered opening device 57 provided in the inside space of the sliding door 2. The vehicle body 1 is provided with a body-side terminal 82 which is connected through a controller 45 to a battery 66 mounted on the vehicle body 1. When the sliding door 2 is moved toward the closed position from the open position, the door-side terminal 81 electrically comes into contact with the body-side terminal 82 before the sliding door 2 comes to the half-latched position. Through this contact, the electric power from the battery 66 is supplied to the powered closing device 58 and the powered opening device 57. In addition, the signals from the switches 56, 64 provided in the door 2 are also transmitted to the controller 45 through the terminals 81, 82.

Figure 14:
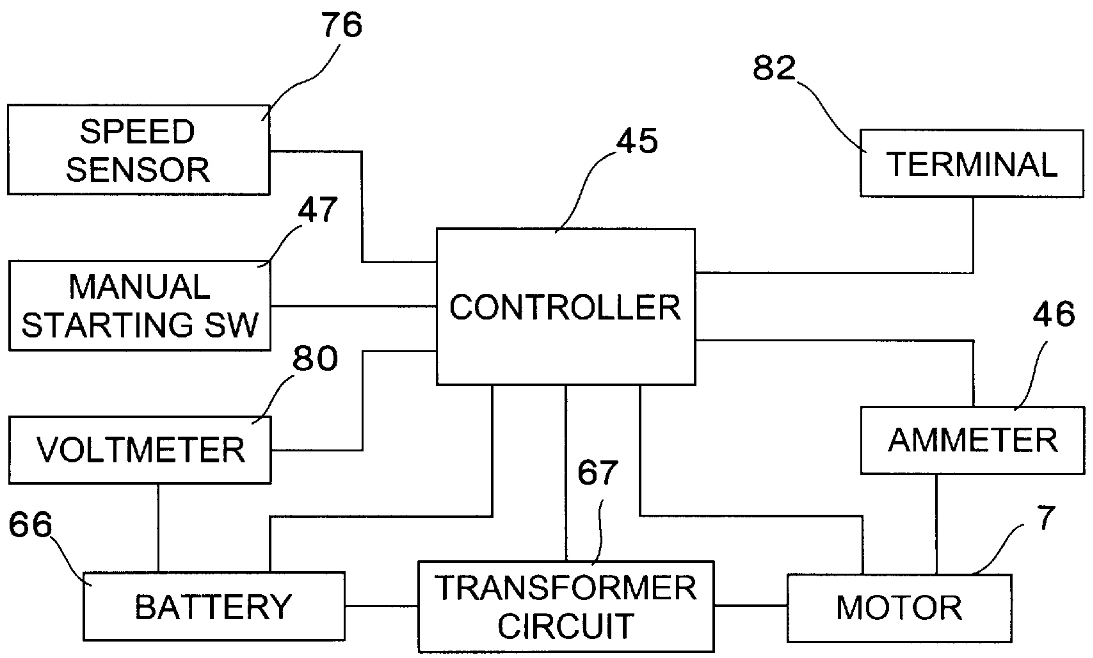
FIG. 14 is a diagram of a block circuit for performing control operations of the present invention.

FIG. 14 is a diagram of a block circuit for performing the control operations of the present invention. The block circuit comprises an ammeter 46 of the motor 7, a manual starting switch 47 for restoring the clutch mechanism 15 to the uncoupled state from the coupled state, a voltmeter 80 for measuring the battery voltage BV of the battery 66, and a transformer circuit 67 for transforming the battery voltage BV to the motor voltage MV to be supplied to the motor 7. The transformer circuit 67 is preferably a pulse-width modulation circuit. The block circuit further comprises a speed sensor 76 for detecting the sliding speed SS of the sliding door 2. The sensor 76 preferably measures the sliding speed SS by detecting the rotational speed of the wire drum 8. The sensor 76 is more preferably a photosensor disclosed in U.S. Pat. No. 5,833,301. The photosensor can detect the rotational speed of the wire drum 8 (=sliding speed of the door 2), the rotational amount of the wire drum 8 (=travel amount of the door 2), and the rotational direction of the wire drum 8 (=traveling direction of the door 2).

OPERATION

Uncoupled State of Clutch Mechanism 15

As shown in FIG. 4, when both clutch pins 30, 31 of the clutch arms 26, 27 pivoted to the boss portions 24, 25 of the clutch plate 20 by shafts 28, 29 are engaged with the inner slots 34, 35 (of the guide plate 18) formed at a constant distance from the drum shaft 12, the clutch pawls 41, 42 of the clutch arms 26, 27 are both separated from the projections 40 of the wire drum 8 so as to be disengaged therewith. This state where both clutch pawls 41, 42 are disengaged from the projections 40 is the uncoupled state of the clutch mechanism 15, and in this state, the sliding door 2 can be moved by a manual power in the opening direction or in the closing direction, because the rotation of the wire drum 8 in any direction is not transmitted to the clutch pawls 41, 42 (guide plate 18 coupled with the motor 7).

Coupled State of Clutch Mechanism 15

In the uncoupled state, when rotating the motor 7 in the closing direction, the guide plate 18 is rotated in the closing direction in FIG. 4. At this time, since a rotational resistance is applied to the clutch plate 20 by the elasticity of the spring 23, the clutch plate 20 and the clutch arms 26, 27 attached to the plate 20 are not rotated around the drum shaft 12 at the beginning. Therefore, the clutch pins 30, 31 of the clutch arms 26, 27 relatively move in the guide slots 32, 33 of the guide plate 18, and the clutch pin 31 enters the communication slot 37 from the inner slot 35 of the guide slot 33, and the other clutch pin 30 moves only in the inner slot 34 around the drum shaft 12.

Then, the clutch pin 31 is guided by the inside wall 37A of the communication slot 37 to be gradually separated from the drum shaft 12, thereby the clutch arm 27 is swung outward in the direction of the arrow A around the shaft 29. When the pin 31 reaches the outer slot 39 from the communication slot 37, the clutch pawl 42 of the clutch arm 27 projects outward to the utmost to enter the gap Y between projections 40, 40, and the clutch pin 31 is then engaged with the engaging portion 39A of the outer slot 39. During that moment, the other clutch pin 30 merely moves in the inner slot 34 around the drum shaft 12, and accordingly, the other clutch arm 26 does not swing in the direction of the arrow A.

Figure 7:
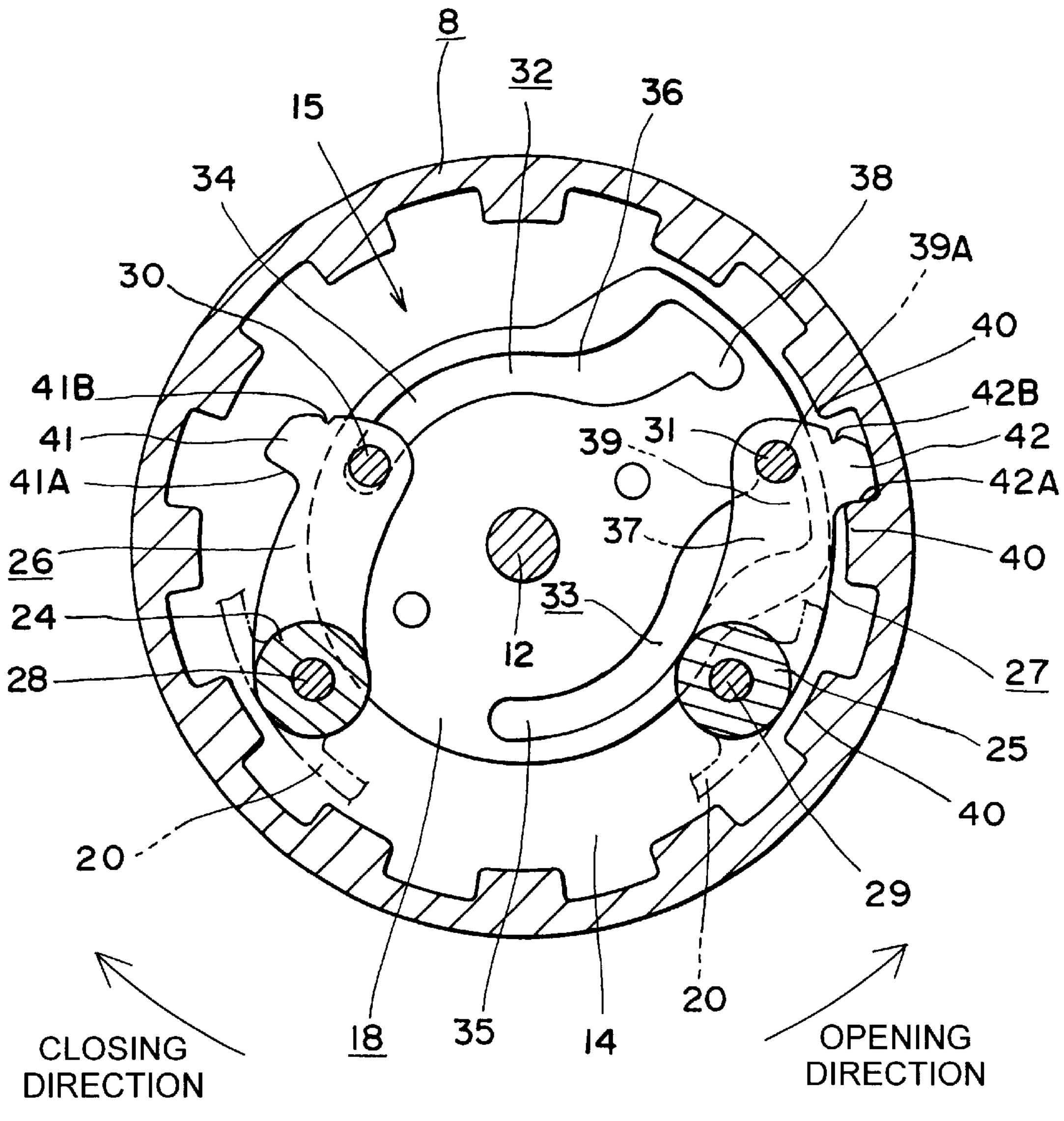
FIG. 7 is a cross sectional view showing a first coupled state of the clutch mechanism.

When the guide plate 18 is continuously rotated in the closing direction by the motive power of the motor 7 after the clutch pin 31 has been engaged with the engaging portion 39A of the outer slot 39, the engaging portion 39A pushes the clutch pin 31 to rotate the clutch arm 27 and the clutch plate 20 around the drum shaft 12 in the closing direction, and then, as shown in FIG. 7, the coupling face 42A of the clutch pawl 42 is engaged with the projection 40 of the wire drum 8. This state where the coupling face 42A of the clutch pawl 42 is engaged with the projection 40 is the coupled state (first coupled state) of the clutch mechanism 15. In the coupled state, the clutch arm 27 cannot be restored in the opposite direction of the arrow A since the clutch pin 31 is engaged with the semicircular engaging portion 39A.

In the first coupled state of FIG. 7, when the guide plate 18 is continuously rotated in the closing direction, the clutch pawl 42 pushes the projection 40 to rotate the wire drum 8 in the closing direction, thereby the sliding door 2 is slid in the closing direction through the wire cable 9.

In FIG. 4, when rotating the guide plate 18 in the opening direction by the opening rotation of the motor 7, the other clutch arm 26 is swung in the direction of the arrow A, and then, as shown in FIG. 12, the coupling face 41A of the clutch pawl 41 is engaged with the projection 40 so as to rotates the wire drum 8 in the opening direction. This state where the coupling face 41A of the clutch pawl 41 is engaged with the projection 40 is another coupled state (second coupled state) of the clutch mechanism 15.

Brake State of Clutch Mechanism 15

When the sliding door 2 is slid in the closing direction or in the opening direction by the motive power of the motor 7, the motive power of the motor is transmitted to the wire drum 8 through the first coupled state (FIG. 7) or the second coupled state (FIG. 12) of the clutch mechanism 15, and sliding door 2 is slid at a predetermined speed set by the motor 7 (and the reduction mechanism thereof). However, when a strong external force in the direction of accelerating the door 2 is applied to the door 2 which is being slid by the motive power of the motor 7, the sliding door 2 is intended to slide at an over speed exceeding the above predetermined speed. Almost all of such the external door-accelerating force EAF is the gravitational force which is applied to the door 2 due to the inclination of the vehicle body 1. The clutch mechanism 15 of the present embodiment is shifted to the brake state in order to prevent the over speed of the sliding door 2 when such the external force EAF is applied to the sliding door 2.

The shift to the brake state of the clutch mechanism 15 will be described. For example, in the first coupled state (FIG. 7) for sliding the sliding door 2 in the closing direction, when the external door-accelerating force EAF is applied to the sliding door 2, the wire drum 8 coupled-with the sliding door 2 through the wire cable 9 is rotated in the closing direction at a speed faster than that of the guide plate 18 which is rotated in the closing direction at the predetermined speed by the motive power of the motor 7. Then, as shown in FIG. 8, another projection 40 catches up with and comes into contact with the brake dent 42B of the clutch pawl 42, and rotates the clutch arm 27 (and clutch plate 20) in the closing direction around the drum shaft 12 at the over speed, thereby the clutch pin 31 of the clutch arm 27 is pushed out of the engaging portion 39A and moves in the outer slot 39 to come into contact with the contact face 39B of the outer slot 39 as shown in FIG. 9. During this moment, the clutch arm 27 does not swing in the opposite direction of the arrow A because of the engagement between the brake dent 42B and the projection 40, even if the engagement between the clutch pin 31 and the engaging portion 39A is released.

As shown in FIG. 9, when the clutch pin 31 comes into contact with the contact face 39B of the outer slot 39, the external door-accelerating force EAF is transmitted from the wire drum 8 to the guide plate 18 through the clutch pin 31. However, since the guide plate 18 is connected to the motor 7 through the reduction mechanism, the plate 18 cannot be rotated at a speed exceeding the predetermined speed set by the motor 7 and the reduction mechanism. Accordingly, a braking resistance by the guide plate 18 is applied to the sliding door 2 to decelerate the sliding door 2 down to the predetermined speed. The state where the projection 40 is engaged with the brake dent 42B to restrict the over speed of the sliding door 2 is the brake state (first brake state) of the clutch mechanism 15.

Similarly, in the second coupled state (FIG. 12) for sliding the sliding door 2 in the opening direction, when the external door-accelerating force EAF is applied to the sliding door 2, the projection 40 is engaged with another brake dent 41B of the clutch arm 26. This state is another brake state (second brake state) of the clutch mechanism 15.

Thus, the clutch mechanism 15 of the present embodiment keeps the sliding speed of the sliding door 2 constant by shifting to the brake state from the coupled state, even if the external door-accelerating force EAF is applied to the sliding door 2.

Restoration of Clutch Mechanism 15 to Uncoupled State from Coupled State by Motor 7

The clutch mechanism 15 of the present invention can be restored from the coupled state by rotating the motor 7 to the uncoupled state in the reverse direction for a predetermined time or by a predetermined amount R on the basis of the restoring operation of the controller 45.

Figure 10:
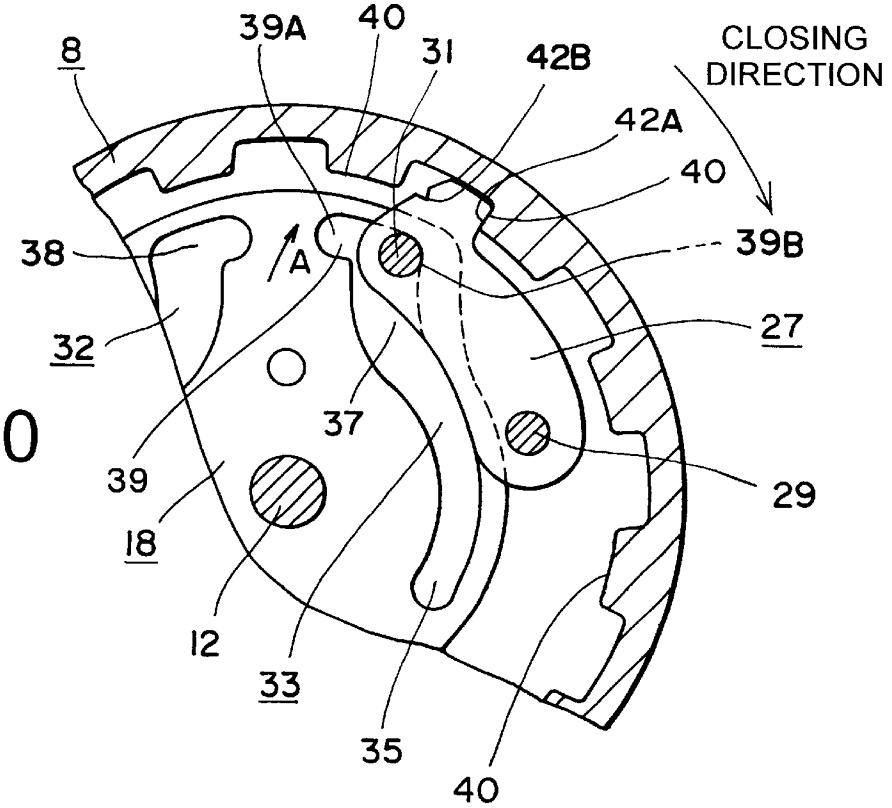
FIG. 10 is a cross sectional view showing a state where the wire drum is rotated in an opening direction from the state in FIG. 9.

When reversing the motor 7 so as to rotate the guide plate 18 in the opening direction while the clutch mechanism 15 is in the first coupled state shown in FIG. 7 by the closing direction of the motor 7 (guide plate 18), the engaging portion 39A of the outer slot 39 is separated from the clutch pin 31 of the clutch arm 27, and the contact face 39B on the opposite side comes into contact with the clutch pin 31 (FIG. 10). In this state, the brake dent 42B is not engaged with the projection 40. Accordingly, the clutch pin 31 is restored to the inner slot 35 through the communication slot 37 due to the further opening rotation of the guide plate 18 while being guided by the contact face 39B and the outside wall 37B, and the clutch arm 27 is swung in the opposite direction of the arrow A. When the guide plate 18 is stopped by the completion of the reverse rotation of the motor 7 in the predetermined amount R, the clutch mechanism 15 is restored to the uncoupled state as shown in FIG. 4, and the clutch pawl 42 is disengaged from the projection 40.

In the above operation, the motor 7 has substantially no load since the door 2 is not caused to move. Accordingly, when restoring the clutch mechanism 15 to the uncoupled state from the coupled state, the current value of the motor 7 measured by the ammeter 46 is substantially constant. The restoring operation of the controller 45 is finished when the reverse rotation of the motor 7 in the predetermined amount R is completed with no change of the load of the motor 7.

The restoration to the uncoupled state from the second coupled state of the clutch mechanism 15 is also performed on the basis of the same principle.

Restoration of Clutch Mechanism 15 to Uncoupled State from Brake State by Motor 7

The clutch mechanism 15 of the present invention can be restored from the brake state to the uncoupled state through the coupled state by the motive power of the motor 7.

In the first coupled state (FIG. 7) of the clutch mechanism 15 for sliding the door 2 in the closing direction, when the external door-accelerating force EAF is applied to the door 2, the clutch mechanism 15 is shifted to the first brake state as shown in FIG. 9 where the projection 40 is engaged with the brake dent 42B. At this moment, it is unnecessary that the controller 45 judges whether the clutch mechanism 15 is in the first coupled state or in the first brake state. Because, the controller 45 performs the restoring operation of reversing the motor 7 in the predetermined amount R in any state while monitoring the current value of the motor 7 when restoring the clutch mechanism 15 to the uncoupled state. At this time, if the clutch mechanism 15 is in the first coupled state, as described above, the rotation in the predetermined amount R of the motor 7 is completed without substantial change of the current value of the motor 7 occurring, and the clutch mechanism 15 is restored from the first coupled state to the uncoupled state.

However, when rotating the motor 7 in the reverse (opening) direction by the restoring operation while the clutch mechanism 15 is in the first brake state (FIG. 9), the opening rotation of the guide plate 18 is immediately transmitted to the wire drum 8 through the contact between the brake dent 42B and the projection 40, and consequently, the load of the motor 7 is detected by the ammeter 46 before the opening rotation in the predetermined amount R of the motor 7 is completed.

When a substantial load of the motor 7 is detected during the reverse rotation of the motor 7, the controller 45 immediately rotates the motor 7 in the closing direction. Then, in FIG. 9, the guide plate 18 is rotated in the closing direction alone, the engaging portion 39A of the outer slot 39 is engaged with the clutch pin 31, and consequently, the clutch arm 27 is rotated around the drum shaft 12 in the closing direction. After that, the coupling face 42A of the clutch pawl 42 is brought into contact with the projection 40, and the clutch mechanism 15 is shifted to the first coupled state shown in FIG. 7. When the coupling face 42A of the clutch pawl 42 comes into contact with the projection 40, the closing rotation of the guide plate 18 is transmitted to the wire drum 8, thus a substantial load of the motor 7 is detected. In the restoring operation, the controller 45 can confirm the shift of the clutch mechanism 15 to the first coupled state from the first brake state by detecting the second load of the motor 7, and the controller 45 rotates the motor 7 in the predetermined amount R in the opening direction. Consequently, as described above, the clutch mechanism 15 is restored to the uncoupled state.

The restoration to the uncoupled state from the second brake state of the clutch mechanism 15 is also performed on the basis of the same principle.

Restoration of Clutch Mechanism 15 to Uncoupled State from Brake State by Manual Power The clutch mechanism 15 of the present invention can be restored from the brake state to the uncoupled state by the manual power even when the motor 7 is in trouble.

Figure 11:
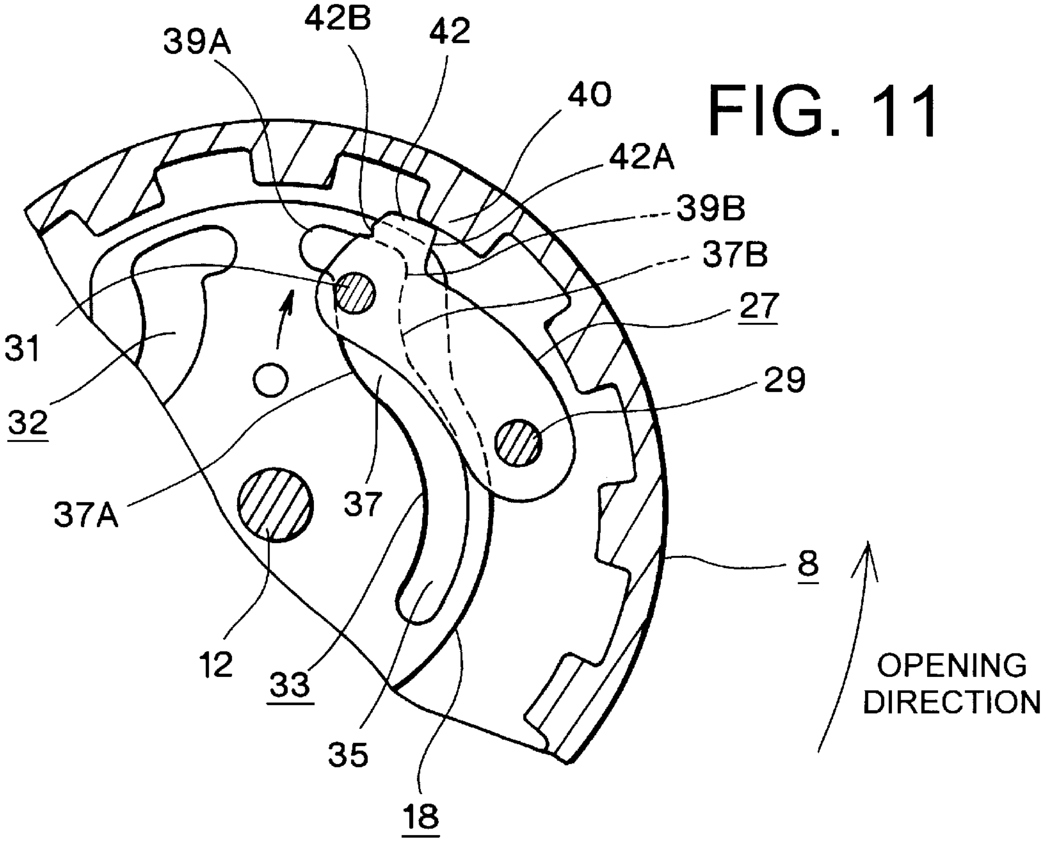
FIG. 11 is a cross sectional view showing a state where the wire drum is rotated in the closing direction from the state in FIG. 10.

In the first brake state shown in FIG. 9, when the motor 7 breaks down, the wire drum 8 cannot be rotated in the closing direction since the clutch pin 31 of the clutch arm 27 is in contact with the contact face 39B of the outer slot 39. However, the drum 8 is rotatable in the opening direction. Therefore, the sliding door 2 is caused to be slid in the opening direction by the manual power so as to rotate the wire drum 8 in the opening direction through the wire cable 9. Then, the projection 40 of the drum 8 is separated from the brake dent 42B, and as shown in FIG. 10, another projection 40 is brought into contact with the coupling face 42A of the clutch pawl 42 to swing the clutch arm 27 in the opposite direction of the arrow A, thereby, as shown in FIG. 11, the clutch pawl 42 is disengaged from the projection 40. The clutch pin 31 shown in FIG. 11 is positioned in the communication slot 37, and is not restored to the inner slot 35, but this state is also included in the uncoupled state of the clutch mechanism 15.

The restoration to the uncoupled state from the second brake state of the clutch mechanism 15 is also performed on the basis of the same principle.

Restoration of Clutch Mechanism 15 to Uncoupled State from Coupled State by Manual Power The clutch mechanism 15 of the present invention can be restored from the coupled state to the uncoupled state by the manual power even when the motor 7 is in trouble.

In the first coupled state shown in FIG. 7, when the motor 7 breaks down, the wire drum 8 cannot be rotated in the opening direction since the clutch pin 31 is engaged with the engaging portion 39A of the outer slot 39. However, the drum 8 is rotatable in the closing direction. Therefore, the sliding door 2 is caused to be slid in the closing direction by the manual power so as to rotate the wire drum 8 in the closing direction. Then, the projection 40 is separated from the coupling face 42A of the clutch pawl 42, and as shown in FIG. 8, another projection 40 is brought into contact with the brake dent 42B of the clutch pawl 42 to rotate the clutch arm 27 in the closing direction around the drum shaft 12, and consequently, the clutch mechanism 15 is shifted to the first brake state shown in FIG. 9. After the shift to the first brake state, when sliding the door 2 in the opening direction by the manual power, as described above, the clutch mechanism 15 is restored to the uncoupled state. The finish of the shift to the first brake state of the clutch mechanism is detected by the fact that a further sliding movement in the closing direction of the sliding door 2 is impossible because of the contact between the clutch pin 31 and the contact face 39B.

The restoration to the uncoupled state from the second coupled state of the clutch mechanism 15 is also performed on the basis of the same principle.

Full-Open Holder 60

When moving the sliding door 2 up to a predetermined position in the opening direction by the motor 7, the door 2 comes into contact with the full-open holder 60, and then the door runs over the holder 60, elastically deforming the same, and moves to the full-open position. When the sliding door 2 has reached the full-open position, the controller 45 reverses the motor 7 only by the predetermined amount R to restore the clutch mechanism 15 to the uncoupled state. The door 2 which has moved to the full-open position is held at the full-open position by the elastically restored full-open holder 60.

Complete Door Closing by Powered Closing Device 58

When sliding the sliding door 2 toward the closed position from the open position by the closing rotation of the motor 7 of the powered sliding device 5, the terminal 81 of the sliding door 2 is electrically brought into contact with the terminal 82 of the vehicle body 1, and the electric power of the battery 66 is then supplied to the powered closing device 58 provided in the door 2 through the terminals 81, 82. When the door 2 is further slid in the closing direction, the latch 5 of the latch assembly 4 is brought into contact with the striker 3, and is rotated from the unlatched position to the alf-latched position. Incidentally, when the door 2 reaches the half-latched position passing through the terminal mutual contact point, the clutch mechanism 15 will be surely restored to the first coupled state since an external door-decelerating force EDF such as the resistance of a water-proof rubber seal is added to the door 2.

When the controller 45 detects the half-latched position of the latch 5 on the basis of a signal from the latch switch 56, the controller performs the restoring operation of restoring the clutch mechanism 15 from the first coupled state to the uncoupled state, and thereafter the controller stops the operation of the powered sliding device 5. At the same time, the controller 45 operates the powered closing device 58 to rotate the latch 50 from the half-latched position to the full-latched position so as to completely close the sliding door 2. When the full-latched position of the latch 50 is detected by the latch switch 56, the controller 45 stops the operation of the closing device 58.

Control Operation of Controller 45

The controller 45 has the safety operation for dealing with the abnormal movement of the sliding door 2 such as an accident in which the body of an operator or a package is caught between the vehicle body 1 and the door 2, and the quality operation for improving the operational feeling of the door 2 and the durability of each part of the device by controlling the sliding speed SS of the door 2.

Figure 17A:
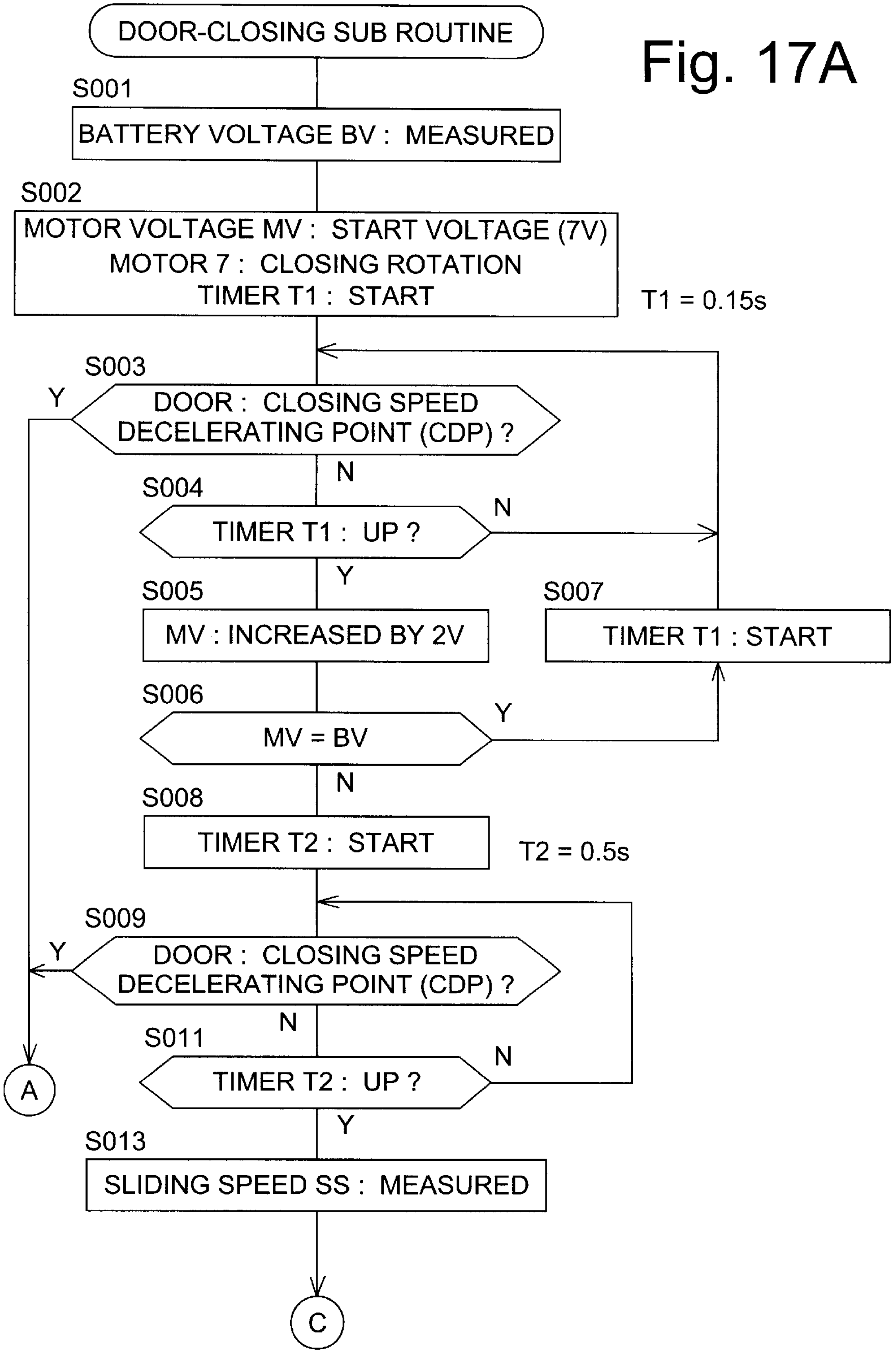
FIGS. 17A to 17C are flow charts showing the door-closing sub routine of closing the door by the powered sliding device.
Figure 17B:
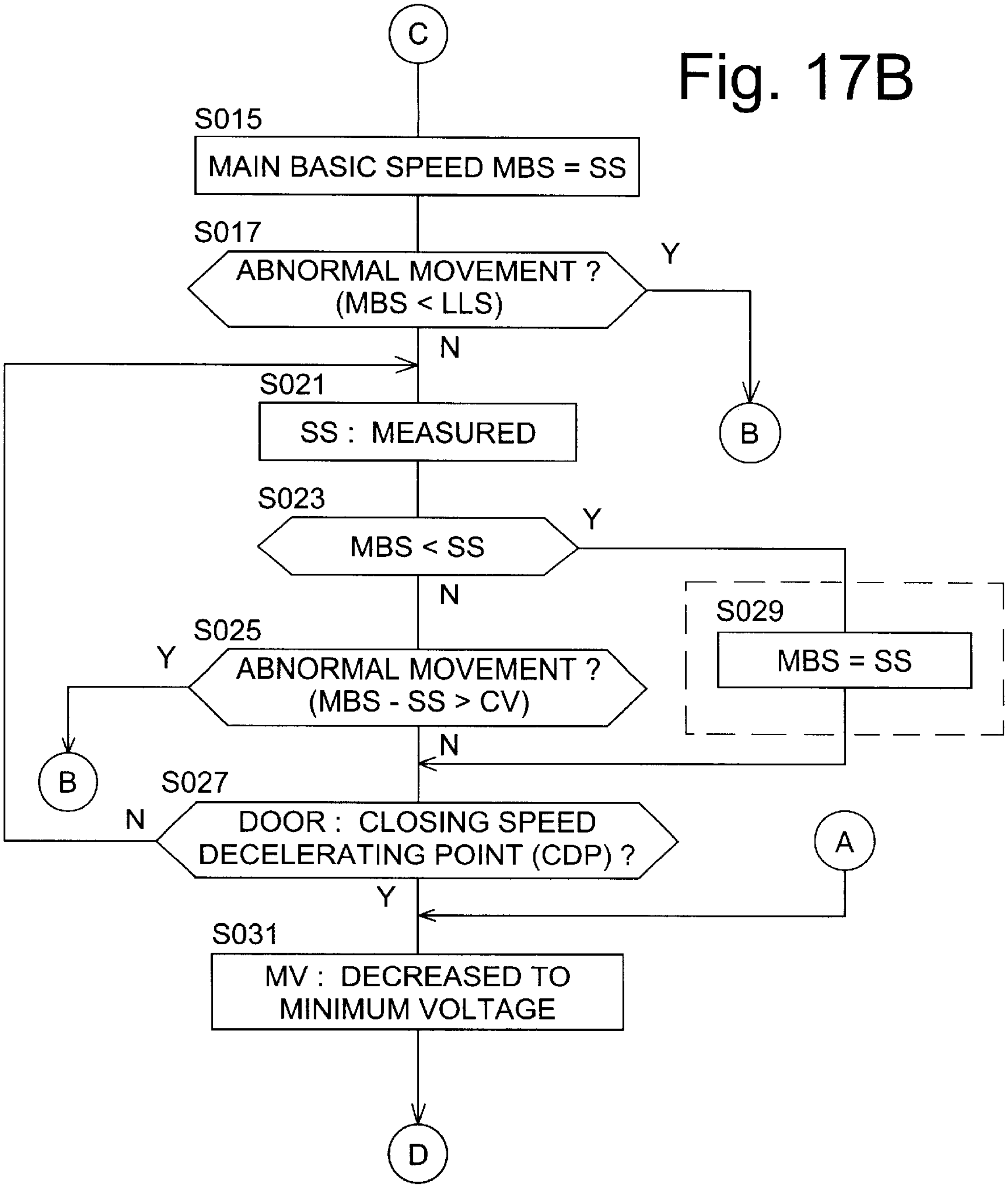
Figure 17C:
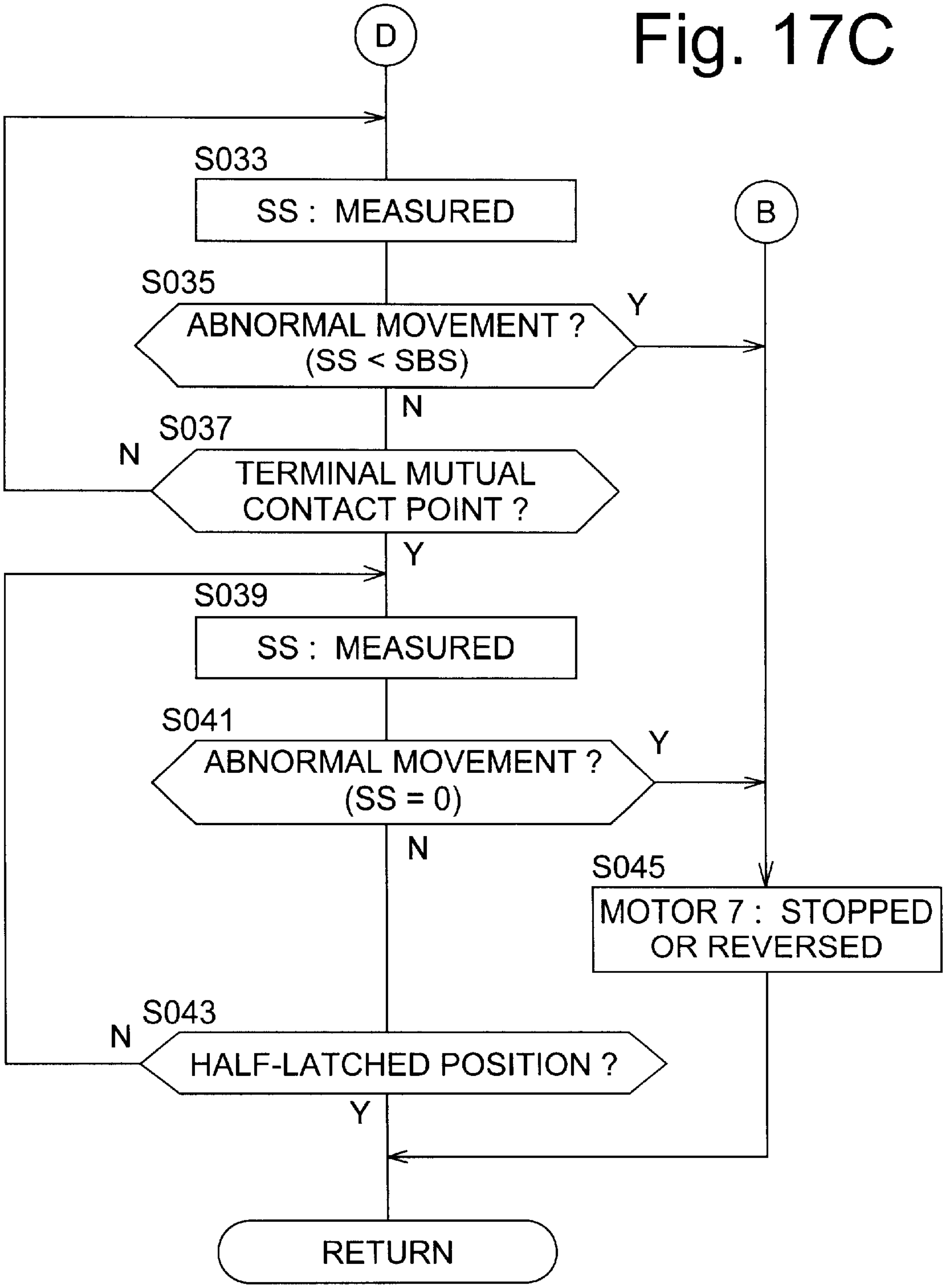

First, the control operation of moving the door 2 in the closing direction by the powered sliding device 5 will be described by referring to the time chart of FIG. 15 and the flow chart of FIGS. 17A to 17C.

When the sliding door 2 is intended to be closed by the motor 7, first, the battery voltage BV of the battery 66 is measured by using the voltmeter 80 (S001). Next, the transformer circuit 67 decreases the battery voltage BV to the start voltage (about 7 volts) which is supplied to the motor 7 as the motor voltage MV to rotate the motor 7 in the closing direction, and the timer T1 is started (S002). The measuring time of the timer T1 is about 0.15 sec.

If the sliding door 2 has started to slide in the closing direction from a position in the vicinity of the closed position, the sliding door 2 may reach a closing speed decelerating point CDP (S003, S009) which is set at a point apart from the terminal mutual contact point in the opening direction by about 10 centimeters, before the timer T1 or timer T2 is up (S004, S011). In this case, the control of the controller 45 is passed to step S031 in FIG. 17B.

When the timer T1 is up (S004), the transformer circuit 67 increases the motor voltage MV by about 2 volts (S005), and compares the motor voltage MV and the battery voltage BV (S006). If the motor voltage MV is lower than the battery voltage BV, the timer T1 is started again (S007), and when the timer T1 is up (S004), the transformer circuit 67 increases the motor voltage MV again. This is repeated until the motor voltage MV becomes equal to the battery voltage BV. Here, the fact that the motor voltage MV is equal to the battery voltage BV means the finish or stop of the decreasing of the batter voltage BV by the transformer circuit 67. When the motor 7 is rotated by the motor voltage MV of about 7 volts, the initial movement of the door 2 becomes gentle and the load applied to the door 2 and each part of the powered sliding device 5 becomes small. In addition, the movement feeling of the door 2 is improved by gradually increasing the motor voltage MV.

For some time after the stop of the operation of the transformer circuit 67, the sliding speed SS of the door 2 changes a little. Therefore, a stabilizing time of the sliding speed of about 0.5 sec is set by the timer T2 (S008, S011), and when the sliding speed SS is stabilized, the sliding speed SS is measured (S013), and is stored as a main basic speed MBS (S015).

The sliding speed SS of the door 2 depends on the value of the battery voltage BV and the value of the overall resistance OR acting on the sliding door 2. The overall resistance OR includes the mechanical resistance MR between the door 2 and the vehicle body 1, and the external force EDF acting on the sliding door 2 due to the inclination of the vehicle body 1 or the like. When the battery voltage BV is high, the sliding speed SS becomes fast, and the overall resistance OR is intense, the sliding speed SS becomes slow. In the vicinity of the full-open position and in the vicinity of the closed position, the mechanical resistance MR is large and changes, and in the half-way position between the full-open position and the closed position, the mechanical resistance MR is low and stable. However, the magnitude of the mechanical resistance MR at each position where the sliding door exists can be presumed in advance. Accordingly, if the value of the mechanical resistance MR and the value of the battery voltage BV are found, it is possible to calculate the sliding speed SS corresponding to the magnitude of the external force EDF.

Figure 15:
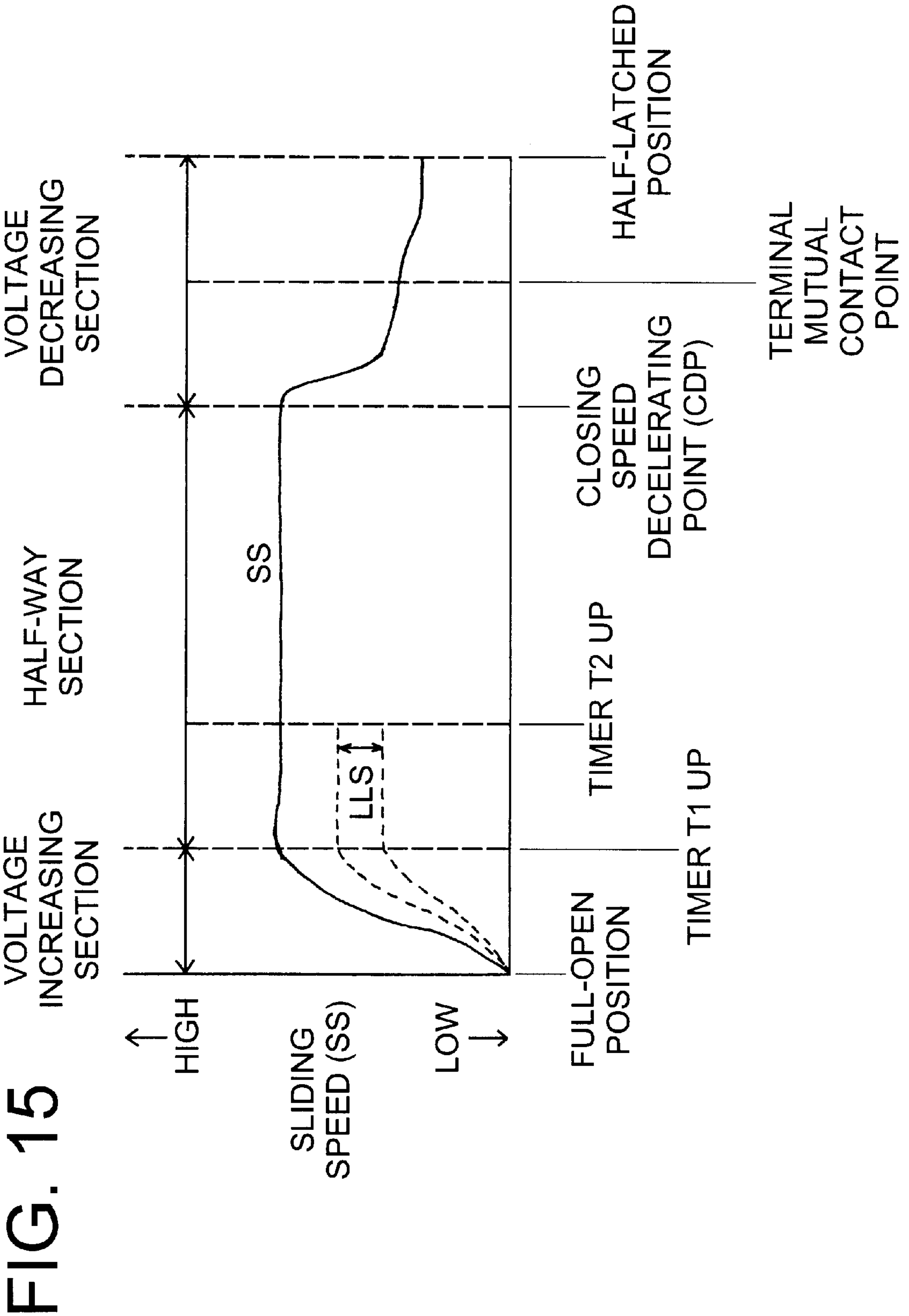
FIG. 15 is a time chart of the closing control in which the horizontal axis shows the position of the sliding door and the vertical axis shows the speed of the door.

The solid line in FIG. 15 shows the sliding speed SS when the battery voltage BV is the standard voltage SV and no external force EDF is applied to the vehicle body 1. The sliding speed SS gradually becomes faster in a voltage increasing section as a first section, and the sliding speed is kept constant in a half-way section, and in a voltage decreasing section the sliding speed gradually becomes slower. Supposing that the external force EDF is the maximum value allowable in the design, the sliding speed is shown by the dotted line as "LLS". When the maximum external force is applied to the door 2, the door is slid at the lower limited speed LLS. The lower limited speed LLS changes according to the value of the battery voltage BV. Furthermore, it should be noticed that, under the circumstance where the actual value of the sliding speed SS and the actual value of the battery voltage BV can be measured and where the value of the mechanical resistance MR can be presumed, the value of the external force EDF can be found from calculation.

In step S015, when the setting of the main basic speed MBS has been finished, the controller 45 compares the basic speed MBS with the lower limited speed LLS corresponding to the measured battery voltage BV (S017). When the basic speed MBS is slower than the lower limited speed LLS, it means that the sliding door 2 could not normally be accelerated because of the external force EDF exceeding the maximum value allowable in the design. When such an abnormal movement has occurred, the controller 45 stops or reverses the motor 7 (S045). Thus, in the present invention, since the controller 45 performs the safety operation at the beginning of the sliding movement of the door 2 by using the measured battery voltage BV, the abnormal movement can be accurately detected. Incidentally, if the safety operation is performed by using the motor voltage MV instead of using the battery voltage BV, an accurate detection of the abnormal movement cannot be expected. The reason is that the motor voltage MV extremely changes depending on the magnitudes of the load applied to the motor 7 or the circuit resistance from the motor 7 to the battery 66.

In step S017, when no abnormal movement of the door 2 is detected, the controller 45 slides the door 2 in the closing direction while measuring the sliding speed SS (S021). During this moment, the controller 45 compares the measured sliding speed SS with the main basic speed MBS whenever necessary (S023). When the sliding speed SS is faster than the basic speed MBS, it means that the external door-accelerating force EAF has been applied to the sliding door 2. However, since the clutch mechanism 15 of the present invention has the brake state for preventing the over speed of the door 2, the door 2 is decelerated at once down to the basic speed MBS. When the clutch mechanism has the brake state, the next step S029 is bypassed. However, when using a clutch mechanism having no brake state such as a clutch mechanism in U.S. Pat. No. 5,833,301, the basic speed MBS is renewed to the measured sliding speed SS (S029).

When the sliding speed SS becomes slower than the main basic speed MBS by a difference exceeding a comparative variable CV while the sliding door 2 is moving in the half-way section, it is considered that an abnormal movement has occurred (S025). The comparative variable CV is changed according to the degree of the basic speed MBS. The comparative variable CV is made small when the basic speed MBS is fast, and the comparative variable CV is made large when the basic speed MBS is slow. For example, the comparative variable CV is made to be "5" when the basic speed MBS is "100" which is comparatively fast. Accordingly, when the sliding speed SS becomes less than "95", the movement of the door 2 is considered abnormal. On the contrary, the comparative variable CV is made to be "10" when the basic speed MBS is "80" which is comparatively slow. Accordingly, when the sliding speed SS becomes less than "70", the movement of the door 2 is considered abnormal. Thus, as the comparative variable CV is changed according to the degree of the basic speed MBS, it is possible to more accurately detect the abnormal movement. When an additional external door-decelerating force EDF is suddenly generated by a fact that a part of the body of the operator, a package or the like is caught between the door 2 and the vehicle body 1, the door 2 is inevitably decelerated. At this moment, the amount of deceleration becomes small if the sliding speed is fast since the inertia of the door 2 is large, and when the sliding speed is slow, the amount of deceleration becomes large since the inertia of the door 2 is small. However, in the present invention, when the basic speed MBS is fast, the detection standard of the abnormal movement becomes strict, so that a little abnormal movement can also be detected at once. Furthermore, when the basic speed MBS is slow, the detection standard of the abnormal movement becomes loose, so hat an error detection as for deceleration of the door 2 in he normal range can be restrained.

The safety operation using the comparative variable CV is performed until the door 2 reaches the closing speed decelerating point CDP (S027). When the sliding door 2 reaches the closing speed decelerating point CDP, the controller 45 decreases the motor voltage MV to minimum voltage by the transformer circuit 67 to decelerate the door 2 (S031). By the minimum voltage, the motor 7 generates the minimum power necessary for moving the door 2 from the closing speed decelerating point CDP to the half-latched position through the terminal mutual contact point. The minimum voltage is changed according to the value of the overall resistance OR of the door 2 in the voltage decreasing section defined between the closing speed decelerating point CDP and the half-latched position. The value of the overall resistance OR in the voltage decreasing section is determined from the value of the previously supposed mechanical resistance MR and the value of the external force EDF found by the calculation while the door 2 is sliding in the half-way section. The mechanical resistance MR in the voltage decreasing section gradually increases toward the half-latched position from the closing speed decelerating point CDP, and it becomes the maximum resistance at the half-latched position. Therefore, when the door 2 reaches the half-latched position, almost all power of the motor 7 has been consumed, and the sliding speed of the door 2 becomes the minimum speed. It should be noticed that this minimum speed is constant regardless of the degree of the external force EDF found by the calculation. The reason is that the minimum voltage is substantially determined according to the degree of the external force EDF. Thus, in the present invention, since the sliding door 2 is decelerated when reaching the half-latched position, the safety at the section where an abnormal movement may easily occur is improved. Furthermore, the occurrence of noise when the latch 50 crashes into the striker 3 can be reduced. Moreover, since the minimum voltage is supplied to the motor 7, the door 2 can be moved to the half-latched position without fail even when the sliding door 2 is decelerated.

The controller 45 performs the safety operation on the basis of a sub basic speed SBS between the closing speed decelerating point CDP and the terminal mutual contact point. The sub basic speed SBS is determined from the value of the mechanical resistance MR at the terminal mutual contact point and the value of the external force EDF found by the calculation. The controller 45 considers that an abnormal movement has occurred when the measured sliding speed SS (S033) is slower than the sub basic speed SBS (S035).

The controller 45 also watches the sliding speed SS between the terminal mutual contact point and the half-latched position (S039). Between those, it is considered that an abnormal movement has occurred only when the sliding speed SS becomes zero (S041). The reason is that the comparative control is difficult since the sliding speed SS between those is extremely slow. When the sliding door 2 comes to the half-latched position, the control for the motor 7 of the powered sliding device 5 is finished.

In step S003 or step S009, when the sliding door 2 has reached the closing speed decelerating point CDP before the timer Ti or the timer T2 is up, it means that the sliding door 2 has been slid in the closing direction just before the closed position. In this case, the control of the controller 45 is passed to step S031, and the motor voltage MV is decreased. However, in this stage, the value of the external force EDF acting on the sliding door 2 is not found since the main basic speed MBS is not found. In such a case, the controller 45 decreases the motor voltage MV, supposing that the external force EDF is zero.

Figure 16:
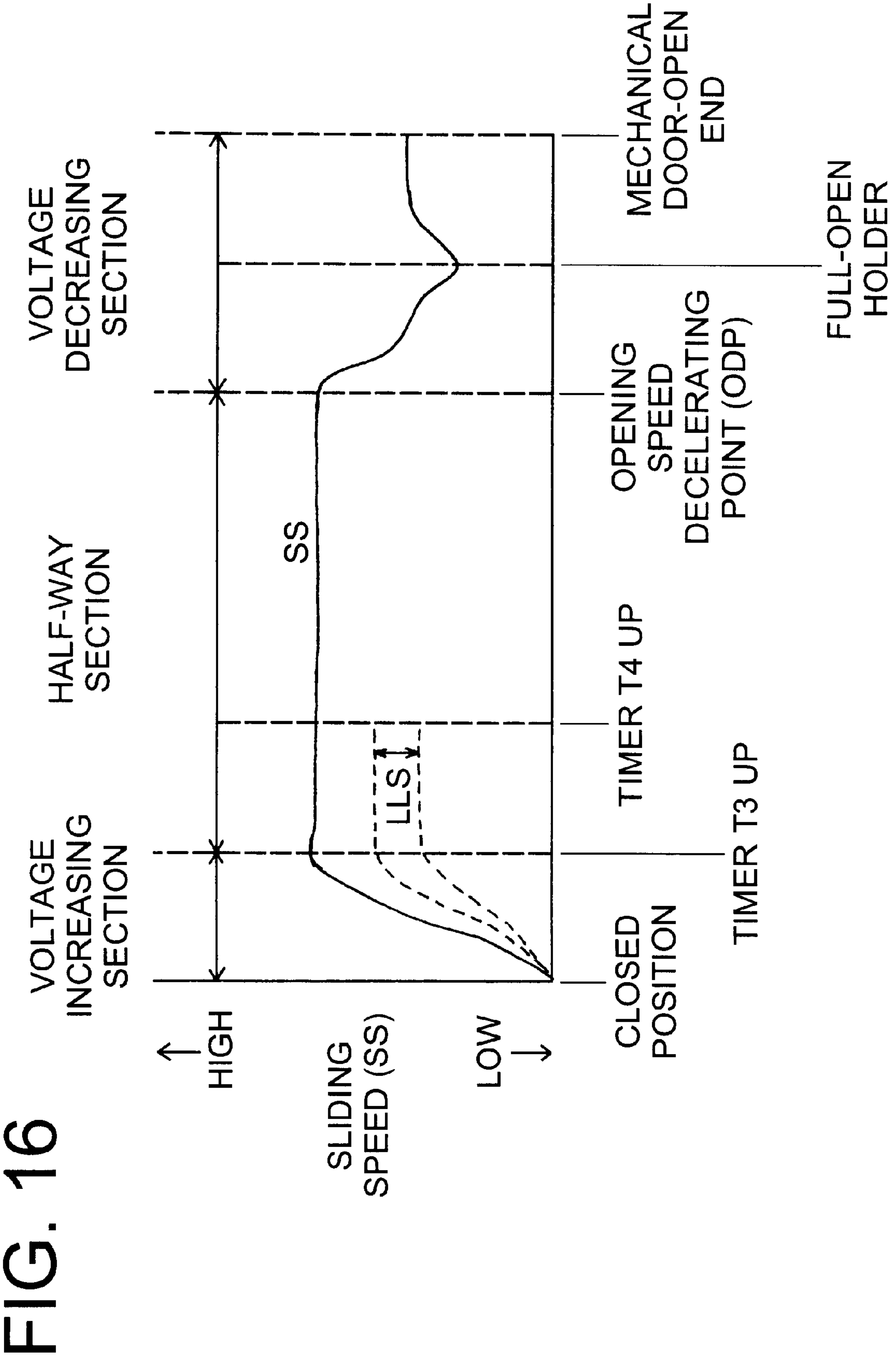
FIG. 16 is a time chart of the opening control in which the horizontal axis shows the position of the sliding door and the vertical axis shows the speed of the door.
Figure 18A:
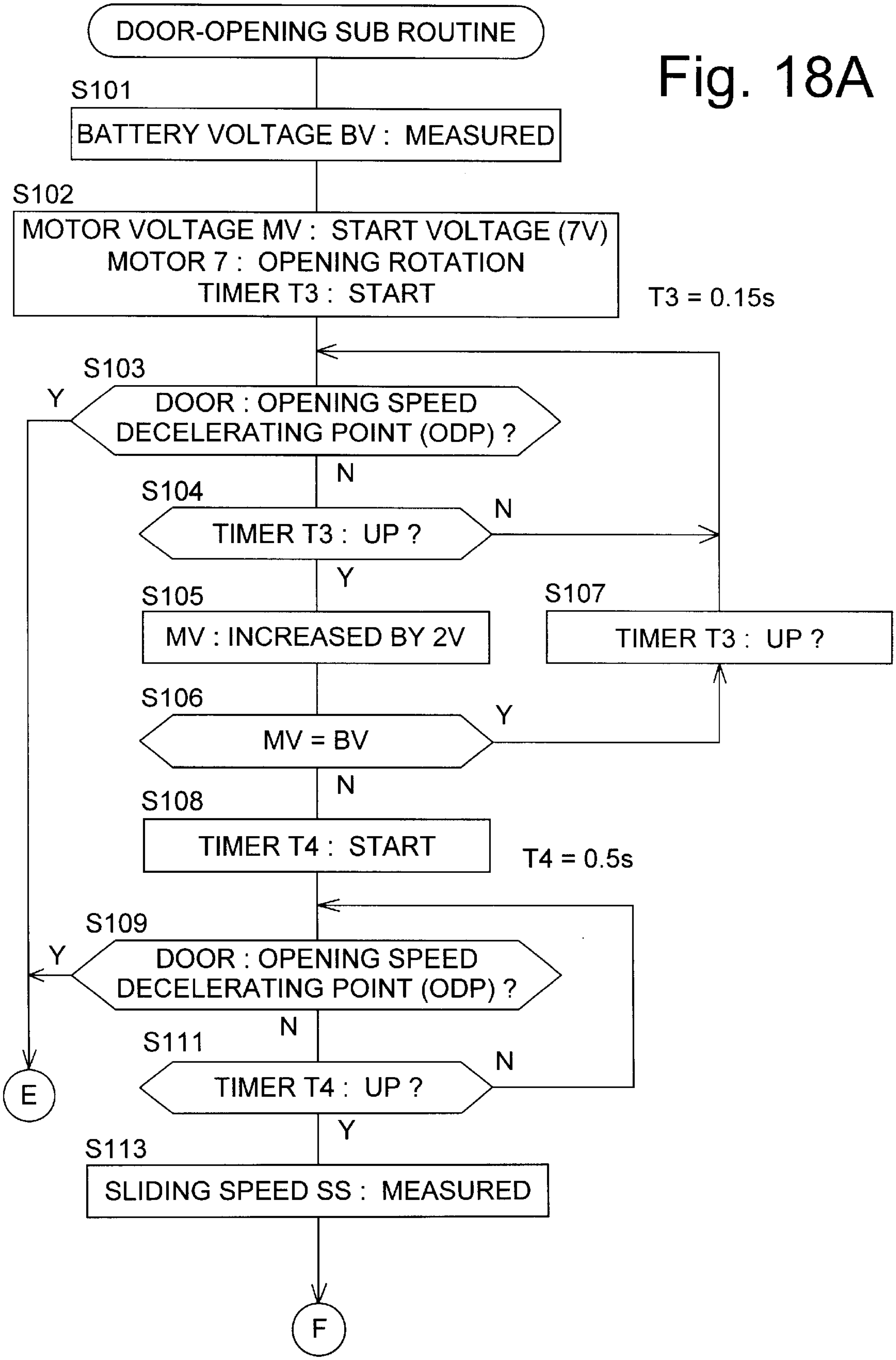
FIGS. 18A, 18B are flow charts showing the door-opening sub routine of opening the door by the powered sliding device.
Figure 18B:
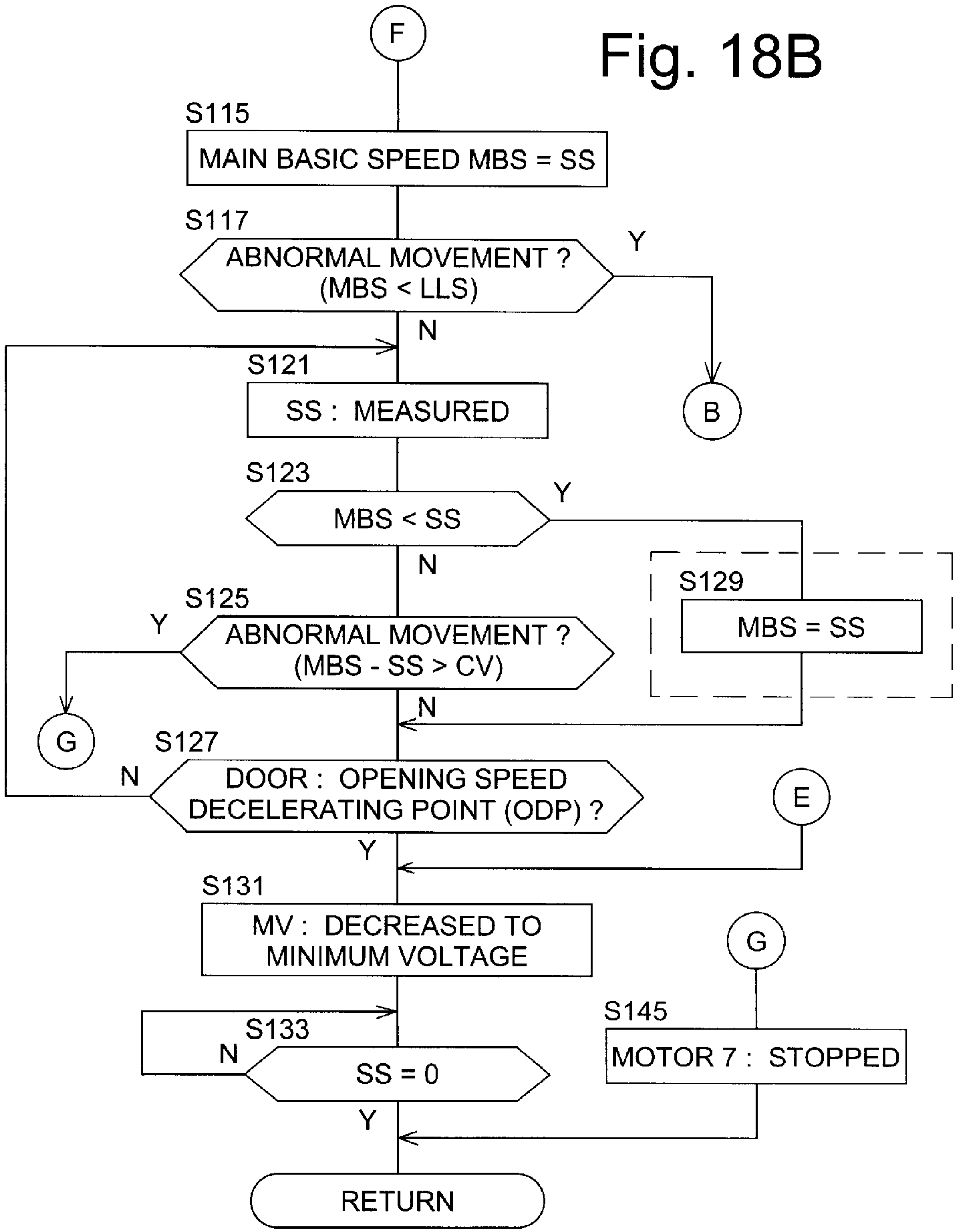

Next, the control operation of moving the door 2 in the pening direction by the powered sliding device 5 will be escribed by referring to the time chart of FIG. 16 and the low chart of FIGS. 18A and 18B.

When the sliding door 2 is intended to be opened by the motor 7, first, the battery voltage BV of the battery 66 is measured by using the voltmeter 80 (S101). Next, the transformer circuit 67 decreases the battery voltage BV to the start voltage (about 7 volts) which is supplied to the motor 7 as the motor voltage MV to rotate the motor 7 in the opening direction, and the timer T3 is started (S102). The measuring time of the timer T3 is about 0.15 sec.

If the sliding door 2 has started to slide in the opening direction from a position in the vicinity of the full-open position, the sliding door 2 may reach an opening speed decelerating point ODP (S103, S109) which is set at a point apart from the center of the full-open holder 60 in the closing direction by about 10 centimeters, before the timer T3 or timer T4 is up (S104, S111). In this case, the control of the controller 45 is passed to step S131 in FIG. 18B.

When the timer T3 is up (S104), the transformer circuit 67 increases the motor voltage MV by about 2 volts (S105), and compares the motor voltage MV and the battery voltage BV (S106). If the motor voltage MV is lower than the battery voltage BV, the timer T3 is started again (S107), and when the timer T1 is up (S104), the transformer circuit 67 increases the motor voltage MV again. This is repeated until the motor voltage MV becomes equal to the battery voltage BV. Here, the fact that the motor voltage MV is equal to the battery voltage BV means the finish or stop of the decreasing of the batter voltage BV by the transformer circuit 67. When the motor 7 is rotated by the motor voltage MV of about 7 volts, the initial movement of the door 2 becomes gentle and the load applied to the door 2 and each part of the powered sliding device 5 becomes small. In addition, the movement feeling of the door 2 is improved by gradually increasing the motor voltage MV.

For some time after the stop of the operation of the transformer circuit 67, the sliding speed SS of the door 2 changes a little. Therefore, a stabilizing time of the sliding speed of about 0.5 sec is set by the timer T4 (S108, S111), and when the sliding speed SS is stabilized, the sliding speed SS is measured (S113), and is stored as a main basic speed MBS (S115).

When the setting of the main basic speed MBS has been finished, the controller 45 compares the basic speed MBS with the lower limited speed LLS corresponding to the measured battery voltage BV (S117). When the basic speed MBS is slower than the lower limited speed LLS, it means that the sliding door 2 could not normally be accelerated because of the external force EDF exceeding the maximum value allowable in the design. When such an abnormal movement has occurred, the controller 45 stops the motor 7 (S145). Thus, in the present invention, since the controller 45 performs the safety operation at the beginning of the sliding movement of the door 2 by using the measured battery voltage BV, the abnormal movement can be accurately detected.

In step S117, when no abnormal movement of the door 2 is detected, the controller 45 slides the door 2 in the opening direction while measuring the sliding speed SS (S121). During this moment, the controller 45 compares the measured sliding speed SS with the main basic speed MBS whenever necessary (S123). When the sliding speed SS is faster than the basic speed MBS, it means that the external door-accelerating force EAF has been applied to the sliding door 2. However, since the clutch mechanism 15 of the present invention has the brake state for preventing the over speed of the door 2, the door 2 is decelerated at once down to the basic speed MBS. When the clutch mechanism has the brake state, the next step S129 is bypassed. However, when using a clutch mechanism having no brake state such as a clutch mechanism in U.S. Pat. No. 5,833,301, the basic speed MBS is renewed to the measured sliding speed SS (S129).

When the sliding speed SS becomes slower than the main basic speed MBS by a difference exceeding a comparative variable CV while the sliding door 2 is moving in the half-way section, it is considered that an abnormal movement has occurred (S125). The comparative variable CV is set similar to that of the safety control in the door closing.

The safety operation using the comparative variable CV is performed until the door 2 reaches the opening speed decelerating point ODP (S127). When the sliding door 2 reaches the opening speed decelerating point ODP, the controller 45 decreases the motor voltage MV to minimum voltage by the transformer circuit 67 to decelerate the door 2 (S131). By the minimum voltage, the motor 7 generates the minimum power necessary for moving the door 2 from the opening speed decelerating point ODP to the full-open position (mechanical door-open end). The minimum voltage is changed according to the value of the overall resistance OR of the door 2 between the opening speed decelerating point ODP and the mechanical door-open end. The value of the overall resistance OR is determined from the value of the mechanical resistance MR (including the resistance of the full-open holder 60) and the value of the external force EDF found by the calculation while the door 2 is sliding in the half-way section. The mechanical resistance MR in the voltage decreasing section becomes maximum at the center of the full-open holder 60. Therefore, when the door 2 runs over the full-open holder 60, almost all power of the motor 7 has been consumed, and the sliding speed of the door 2 becomes the minimum speed. It should be noticed that this minimum speed is constant regardless of the degree of the external force EDF found by the calculation. The reason is that the minimum voltage is substantially determined according to the degree of the external force EDF. Thus, in the present invention, since the sliding door 2 is decelerated when running over the full-open holder 60, the feeling of quality when running over the full-open holder 60 is improved. Furthermore, since the shock generated when the sliding door 2 crashes into the vehicle body 1 at the mechanical door-open end is weakened, the occurrence of noise can be reduced, and an extremely quiet opening can be performed. Moreover, since the load of a part of crashing is decreased, the durability is improved. Furthermore, since the minimum voltage is supplied to the motor 7, the door 2 can be moved to the full-open position without fail even when the sliding door 2 is decelerated.

When the sliding door 2 is brought into contact with the vehicle body 1 and the sliding speed SS becomes zero (S133), the control for the motor 7 of the powered sliding device 5 is finished.

In step S103 or step S109, when the sliding door 2 has reached the opening speed decelerating point ODP before the timer T3 or the timer T4 is up, it means that the sliding door 2 has been slid in the opening direction just before the full-open position. In this case, the control of the controller 45 is passed to step S131, and the motor voltage MV is decreased. However, in this stage, the value of the external force EDF acting on the sliding door 2 is not found since the main basic speed MBS is not found. In such a case, the controller 45 decreases the motor voltage MV, supposing that the external force EDF is maximum, so that the sliding door 2 can surely be moved to the full-open position.

What is claimed is:

1. A control method of a powered sliding device having a wire drum coupled through a wire cable with a sliding door slidably attached to a vehicle body, a motor for rotating the wire drum by electric power from a battery, a voltmeter for measuring battery voltage of the battery, and a sensor for detecting a sliding speed of the sliding door, comprising the steps of:

measuring said sliding speed (SS) by said sensor when a predetermined time has elapsed from an actuation of said motor;

comparing said measured sliding speed (SS) with a lower limited speed (LLS) of said sliding door which is determined according to a degree of said battery voltage (BV) measured by said voltmeter; and stopping or reversing said motor when said sliding speed (SS) is slower than said lower limited speed (LLS).

2. A control method of a powered sliding device having a wire drum coupled through a wire cable with a sliding door slidably attached to a vehicle body, a motor for rotating the wire drum by electric power from a battery, a voltmeter for measuring battery voltage of the battery, and a sensor for detecting a sliding speed of the sliding door, comprising the steps of:

measuring said sliding speed (SS) by said sensor when a predetermined time has elapsed from an actuation of said motor;

storing said measured sliding speed (SS) as a main basic speed (MBS);

after that, newly measuring a sliding speed (SS) by said sensor (76);

comparing said newly measured sliding speed (SS) with said main basic speed (MBS); and stopping or reversing said motor when said newly measured sliding speed (SS) is slower than said main basic speed (MBS) by a difference exceeding a comparative variable (CV).

3. The control method of a powered sliding device according to claim 2, wherein said comparative variable (CV) is set small when said main basic speed (MBS) is fast and said comparative variable (CV) is set large when said main basic speed (MBS) is slow.

4. The control method of a powered sliding device according to claim 2, wherein said main basic speed (MBS) is renewed to said newly measured sliding speed (SS) when said newly measured sliding speed (SS) becomes faster than said main basic speed (MBS).

5. A control method of a powered sliding device having a wire drum coupled through a wire cable with a sliding door slidably attached to a vehicle body, a motor for rotating said wire drum by electric power from a battery, a voltmeter for measuring battery voltage of said battery, a sensor for detecting a sliding speed of said sliding door, and a transformer circuit provided between said battery and said motor, wherein when said sliding door is displaced, by a closing rotation of said motor, to a closing speed decreasing point (CDP) which is set at a point apart from a half-latched position in an opening direction by a desired distance, a motor voltage (MV) of said motor is decreased by using said transformer circuit to a minimum voltage necessary for said sliding door to move to said half-latched position from said closing speed decelerating point (CDP).

6. The control method of a powered sliding device according to claim 5, wherein said minimum voltage is determined from said battery voltage (BV) measured by said voltmeter, said sliding speed (SS) measured by said sensor, a previously supposed mechanical resistance (MR) of said sliding door, and an external door-decelerating force (EDF) found from said measured battery voltage (BV) and said measured sliding speed (SS).

7. A control method of a powered sliding device having a wire drum coupled through a wire cable with a sliding door slidably attached to a vehicle body, a motor for rotating said wire drum by electric power from a battery, a voltmeter for measuring battery voltage of said battery, a sensor for detecting a sliding speed of said sliding door, and a transformer circuit provided between said battery and said motor, wherein when said sliding door is displaced, by an opening rotation of said motor, to an opening speed decreasing point (ODP) which is set at a point apart from a full-open holder in a closing direction by a desired distance, a motor voltage (MV) of said motor is decreased by using said transformer circuit to a minimum voltage necessary for said sliding door to move to a full-open position from said opening speed decelerating point (ODP) by running over said full-open stopper.

8. The control method of a powered sliding device according to claim 7, wherein said minimum voltage is determined from said battery voltage (BV) measured by said voltmeter, said sliding speed (SS) measured by said sensor, a previously supposed mechanical resistance (MR) of said sliding door, and an external door-decelerating force (EDF) found from said measured battery voltage (BV) and said measured sliding speed (SS).

* * * * *